US011440782B2

(12) United States Patent
Goncalves et al.

(10) Patent No.: US 11,440,782 B2
(45) Date of Patent: Sep. 13, 2022

(54) SYSTEMS AND METHODS FOR A MOBILE CAROUSEL WITH POWER AND COMMUNICATIONS CONTACTS

(71) Applicant: The Raymond Corporation, Greene, NY (US)

(72) Inventors: Fernando D. Goncalves, Vestal, NY (US); John Bryant Kirk, Greene, NY (US); Keith F. Dolezel, Franklin, NY (US); Joseph A. Weiss, Greene, NY (US); Abdulhameed Al-Shaebi, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 35 days.

(21) Appl. No.: 17/083,005

(22) Filed: Oct. 28, 2020

(65) Prior Publication Data

US 2021/0121920 A1     Apr. 29, 2021

Related U.S. Application Data

(60) Provisional application No. 62/992,548, filed on Mar. 20, 2020, provisional application No. 62/927,278, filed on Oct. 29, 2019.

(51) Int. Cl.
*B07C 3/08*      (2006.01)
*B66F 9/075*    (2006.01)
*B66F 9/24*      (2006.01)
*B66F 9/18*      (2006.01)

(52) U.S. Cl.
CPC .................. *B66F 9/24* (2013.01); *B07C 3/08* (2013.01); *B66F 9/07504* (2013.01); *B66F 9/183* (2013.01)

(58) Field of Classification Search
CPC .. B07C 3/08; B07C 3/082; B07C 3/18; B65G 47/57; B66F 9/24; B66F 9/205; B66F 9/07504
See application file for complete search history.

(56) References Cited

U.S. PATENT DOCUMENTS

| 4,111,452 A | 9/1978 | Carlsson | |
| 4,514,134 A * | 4/1985 | Frye | B66F 9/19 414/659 |
| 4,944,357 A * | 7/1990 | Wible | B60T 1/16 180/169 |

(Continued)

FOREIGN PATENT DOCUMENTS

| CN | 104670779 A | 6/2015 |
| CN | 104960834 B | 6/2019 |

(Continued)

*Primary Examiner* — Michael McCullough
*Assistant Examiner* — Jessica L Burkman
(74) *Attorney, Agent, or Firm* — Quarles & Brady LLP

(57) ABSTRACT

The present disclosure provides a material sorting system adapted to engage a material handling vehicle. The material sorting system can include a base including fork pockets adapted to receive a pair of forks from the material handling vehicle and a carousel assembly coupled to the base. The carousel assembly can include a plurality of storage units, and an actuation mechanism configured to move the plurality of storage units relative to the base. The base can also include at least one electrical contact within the base and in electrical communication with the carousel assembly.

24 Claims, 16 Drawing Sheets

(56) References Cited

U.S. PATENT DOCUMENTS

| | | |
|---|---|---|
| 9,008,828 B2 | 4/2015 | Worsley |
| 9,008,829 B2 | 4/2015 | Worsley |
| 9,008,830 B2 | 4/2015 | Worsley |
| 9,525,288 B2 | 12/2016 | McKernan |
| 9,783,364 B2 | 10/2017 | Worsley |
| 9,935,469 B2 | 4/2018 | McKernan |
| 10,162,401 B1 | 12/2018 | Brys |
| 10,435,241 B2 * | 10/2019 | Lert .................... B65G 1/0478 |
| 10,676,279 B1 | 6/2020 | Bidram |
| 2003/0156501 A1 * | 8/2003 | Spindel ................ G06Q 10/087 369/1 |
| 2004/0079620 A1 * | 4/2004 | Aleshire .............. A47B 63/067 198/711 |
| 2007/0014654 A1 | 1/2007 | Haverfield |
| 2008/0296095 A1 | 12/2008 | Frank |
| 2018/0212434 A1 | 7/2018 | McKernan |
| 2019/0310646 A1 | 10/2019 | DeJarnette |

FOREIGN PATENT DOCUMENTS

| | | |
|---|---|---|
| DE | 10196988 T5 | 4/2004 |
| DE | 102015008829 A1 | 1/2016 |
| EP | 1627847 A1 | 2/2006 |
| JP | H0912292 A | 1/1997 |

* cited by examiner

SYSTEMS AND METHODS FOR A MOBILE CAROUSEL WITH POWER AND COMMUNICATIONS CONTACTS

CROSS-REFERENCES TO RELATED APPLICATIONS

The present application is based on and claims priority to U.S. Provisional Patent Application No. 62/927,278, filed on Oct. 29, 2019 and U.S. Provisional Patent Application No. 62/992,548, filed on Mar. 20, 2020, which are both incorporated herein by reference in their entirety.

STATEMENT REGARDING FEDERALLY SPONSORED RESEARCH

Not Applicable.

BACKGROUND

Typically, a warehouse may include numerous material handling vehicles performing individual tasks simultaneously and storage bins/shelves for organizing goods stored in the warehouse. Conventionally, material handling vehicles have been used to retrieve, transport, and place various types of loads.

SUMMARY

According to some aspects, the present disclosure provides a material handling vehicle configured to receive a load. The material handling vehicle can include a pair of forks and a clamp assembly arranged between the pair of forks. The clamp assembly can include a housing, a first grip arm protruding from the housing and moveably received by the housing, and a second grip arm protruding from the housing and moveably received by the housing. The second grip arm can be laterally opposite the first grip arm. At least one of the first grip arm or the second grip arm can include an electrical contact configured to transfer power or a communication signal.

According to some aspects, the present disclosure provides a material handling vehicle configured to receive a load. The material handling vehicle can include a pair of forks and a clamp assembly arranged between the pair of forks. The clamp assembly can include a housing, a first grip arm pivotally coupled to the housing, and a second grip arm pivotally coupled to the housing. The second grip arm can be laterally opposite to the first grip arm. An electrically conductive material can protrude from a surface of one of the first or second grip arms to form an electrical contact configured to transfer power or a communication signal.

According to some aspects, the present disclosure provides a material handling vehicle adapted to engage a load. The material handling vehicle can include a pair of forks and a clamp assembly arranged between the pair of forks. The clamp assembly can be configured to secure the load to the material handling vehicle when the pair of forks engage a base of the load. The clamp assembly can include a housing, a first grip arm pivotally coupled to the housing, and a second grip arm pivotally coupled to the housing. The second grip arm can be laterally opposite to the first grip arm. The first and second grip arms can be separated by a gap configured to receive a wall within the base of the load. The clamp assembly can also include at least one electrical contact that can protrude from at least one of the first or second grip arms. The at least one electrical contact can be configured to engage with a corresponding electrical contact within the base of the load to transfer power or a communication signal between the material handling vehicle and the load.

According to some aspects, the present disclosure provides a material sorting system adapted to engage a material handling vehicle. The material sorting system includes a base including fork pockets adapted to receive a pair of forks from the material handling vehicle, and a carousel assembly coupled to the base. The carousel assembly includes a plurality of storage units and an actuation mechanism configured to move the plurality of storage units relative to the base. The material sorting system further includes at least one electrical contact within the base and in electrical communication with the carousel assembly. The at least one electrical contact being adapted to engage with a corresponding electrical contact on a clamp assembly of the material handling vehicle to transfer power or a communication signal between the material handling vehicle and the carousel assembly.

According to some aspects, the present disclosure provides a material sorting system that includes a base. The base includes a pair of fork pockets adapted to receive a pair of forks from a material handling vehicle, a top wall, a bottom wall spaced apart from the top wall, and a center wall arranged between the top wall and the bottom wall and dividing the pair of fork pockets. The material sorting system further includes a carousel assembly coupled to the base and having a plurality of storage units and at least one electrical contact within the base and in electrical communication with the carousel assembly. The at least one electrical contact being adapted to transfer power or a communication signal between the material handling vehicle and the carousel assembly.

According to some aspects, the present disclosure provides a material sorting system that includes a carousel assembly. The carousel assembly includes a plurality of storage units and an actuation mechanism configured to move the plurality of storage units relative to the base. The material sorting system further includes an electrical contact in electrical communication with the actuation mechanism. The electrical contact being adapted to engage with a corresponding electrical contact on a material handling vehicle to transfer power or a communication signal between the material handling vehicle and the carousel assembly.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
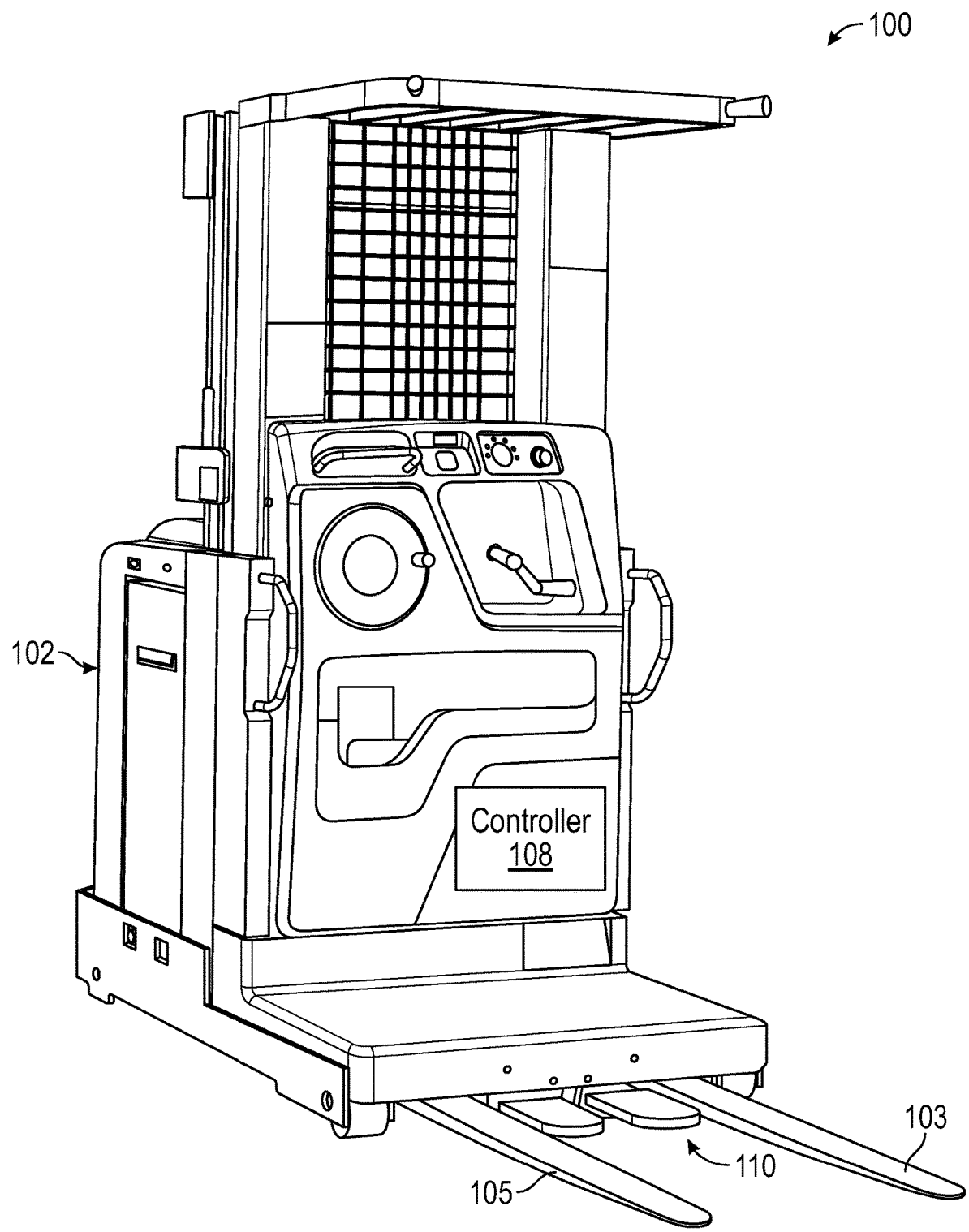
FIG. 1 illustrates an exemplary material handling vehicle incorporating a clamp assembly according to one aspect of the present disclosure.

Before any aspects of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

Material handling vehicles are designed in a variety of configurations to perform a variety of tasks. The present disclosure is not intended to be limited to any specific material handling vehicle, and the systems described herein can also be provided with various other types of material handling vehicle configurations, including for example, pallet trucks (e.g., pallet jacks, "tuggers", and the like), orderpickers, SWING REACH® vehicles, and any other lift or pallet carrying vehicles. The various systems and methods disclosed herein are suitable for any of driver controlled, pedestrian controlled, remotely controlled, and autonomously controlled material handling vehicles.

Material handling vehicles can be used for carrying loads, such as pallets, loads with pallet-like bases, specialty carts, or racks. However, conventional material handling vehicles are unable to transfer power to these loads and the loads themselves are not configured to receive power from a material handling vehicle. Additionally, conventional material handling vehicles are unable to readily exchange information between the material handling vehicle and the load. It can be beneficial to be able to provide power to the load, for example, to be able to power accessories, carts, or other equipment the material handling vehicle is carrying and to transfer information between the load and the material handling vehicle. Some conventional methods of transferring power or information between a material handling vehicle and a load have been accomplished by the installation of cabled connections.

Systems or methods of the present disclosure provide power and/or communications for the loads carried by a material handling vehicle. As used herein, a load can be defined by any structure that is configured to be engaged with, carried by, moved, or transported by a material handling vehicle. For example, a load may include one or more fork pockets configured to receive forks of a material handling vehicle. The fork pockets can be separated by a center wall that can be engaged by a clamp on the material handling vehicle. The present disclosure describes a clamp assembly that can make the transfer of power and information available between a material handling vehicle and a load. Specifically, the clamp assembly can be incorporated into or between the forks on a material handling vehicle, such as a pallet clamp, for example. In some cases, loads can have a center wall within a base of the load (e.g., a center stringer of a pallet) and the clamp assembly can selectively engage with the center wall to secure the load to the material handling vehicle.

The clamp assembly can have electrical contacts in the form of electrical power and/or electronic communication contacts. For example, in instances when the clamp assembly is engaged with a load, the material handling vehicle may provide power and/or electronically communicate with the load. As used herein, an electrical contact can be defined as a structure at least partially formed from an electrically conductive material that can be configured to transmit electrical power or communication signals.

Figure 2:
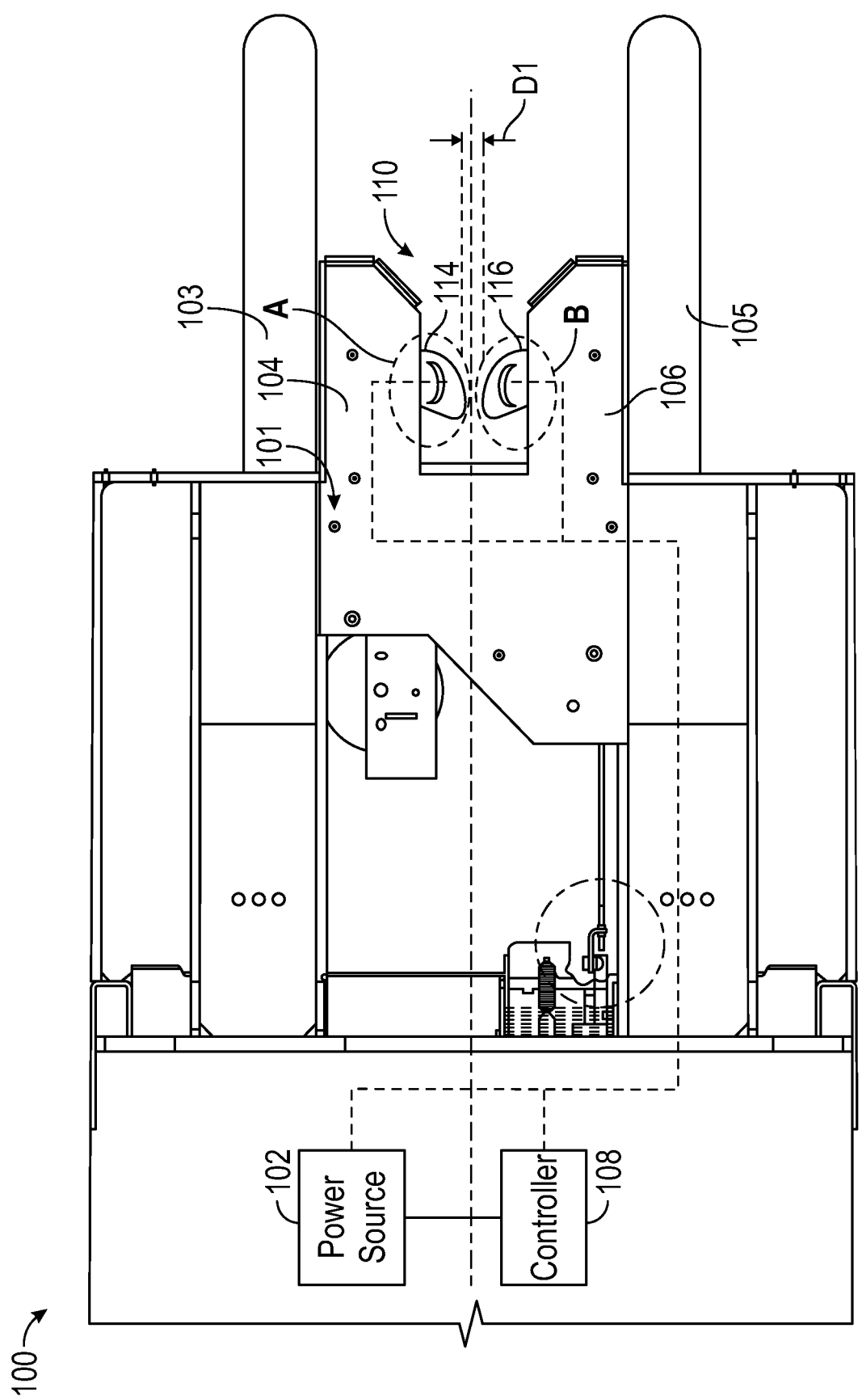
FIG. 2 is a top view of the material handling vehicle of FIG. 1.

Referring to FIGS. 1-2, a material handling vehicle 100 may include a power source 102, a first fork 103, a second fork 105, a controller 108, and a clamp assembly 110. The power source 102 can be a battery installed on the material handling vehicle 100. The power provided by the power source 102 can be passed through a regulated supply device to limit power draw from the clamp assembly 110 to a predetermined limit (e.g., 100 Watts). The power provided by the power source can also pass through various safety and control devices, such as fuses, current limiters, power suppliers, and switches.

The clamp assembly 110 can be configured to selectively engage a load. For example, the clamp assembly 110 can be configured to clamp a center wall (e.g., a center stringer) of a load. The clamp assembly 110 may include a housing 101 with a first arm portion 104, a second arm portion 106, a first grip arm or assembly 114, and a second grip arm or assembly 116. The first grip assembly 114 may be moveably or pivotally engaged with the first arm portion 104. The second grip assembly 116 may be pivotally engaged with the second arm portion 106. The first grip assembly 114 and the second grip assembly 116 may be arranged opposite each other and face one another.

In some embodiments, the first and second grip assemblies 114, 116 can be biased towards each other (e.g., via a spring). As best illustrated in FIG. 2, when no outside forces are applied onto the first and second grip assemblies 114, 116, they are separated by a lateral distance, D1. The lateral distance D1 can define a gap between the first and second grip assemblies 114, 116 that is less than a width of a structure (e.g., a center wall) that is configured to be inserted between the first and second grip assemblies 114, 116. When the structure is inserted between the first and second grip assemblies 114, 116, they can displace away from each other. In this displaced position, the first and second grip assemblies can be biased towards one another (e.g., via a spring) to ensure contact between the first and second grip assemblies 114, 116 and the structure to secure and grip the structure. For example, during operation, the material handling vehicle 100 can be maneuvered into position in front of a load having fork pockets within a base of the load. The first and second forks 103, 105 can then be inserted into fork pockets to bring the clamp assembly 110 into engagement with a center wall arranged between the fork pockets. Upon engagement with the center wall, the first and second grip assemblies 114, 116 can be displaced away from each other to receive the center wall due to the contact between the center wall and the first and second grip assemblies 114, 116. The first and second grip assemblies 114, 116 can then grip the center wall, thereby securing the load to the material handling vehicle 100. In some embodiments, various other types of mechanical clamps can be used in place of the first and second grip assemblies. For example, a hydraulically driven metal plate could be used to engage the load and to transfer power and/or communications to the load.

The clamp assembly 110 can be configured to provide electrical communication between the power source 102 on the material handling vehicle 100 and a load received on the first and second forks 103, 105. The clamp assembly 110 can be in electrical communication with the power source 102. The controller 108 may also be in electrical communication with the clamp assembly 110. In some embodiments, the controller 108 may be configured to selectively articulate the clamp assembly 110. For example, the controller 108 can be configured to selectively rotate the first and second grip assemblies 114, 116 between a deployed position and a stowed position. In the stowed position, the first and second grip assemblies 114, 116 can be received within the first and second arm portions 104, 106 of the housing 101, respectively.

In some embodiments, the first and second grip assemblies 114, 116 can be manually actuated by an operator. For example, the material handling vehicle 100 can have a manually operated foot pedal that, when actuated by an operator, can be configured to selectively rotate the first and second grip assemblies 114, 116 between the deployed position and the stowed position. In other embodiments, an electrical switch can be mounted within an operator compartment to selectively rotate the first and second grip assemblies 114, 116 between the deployed position and the stowed position.

Figure 3:
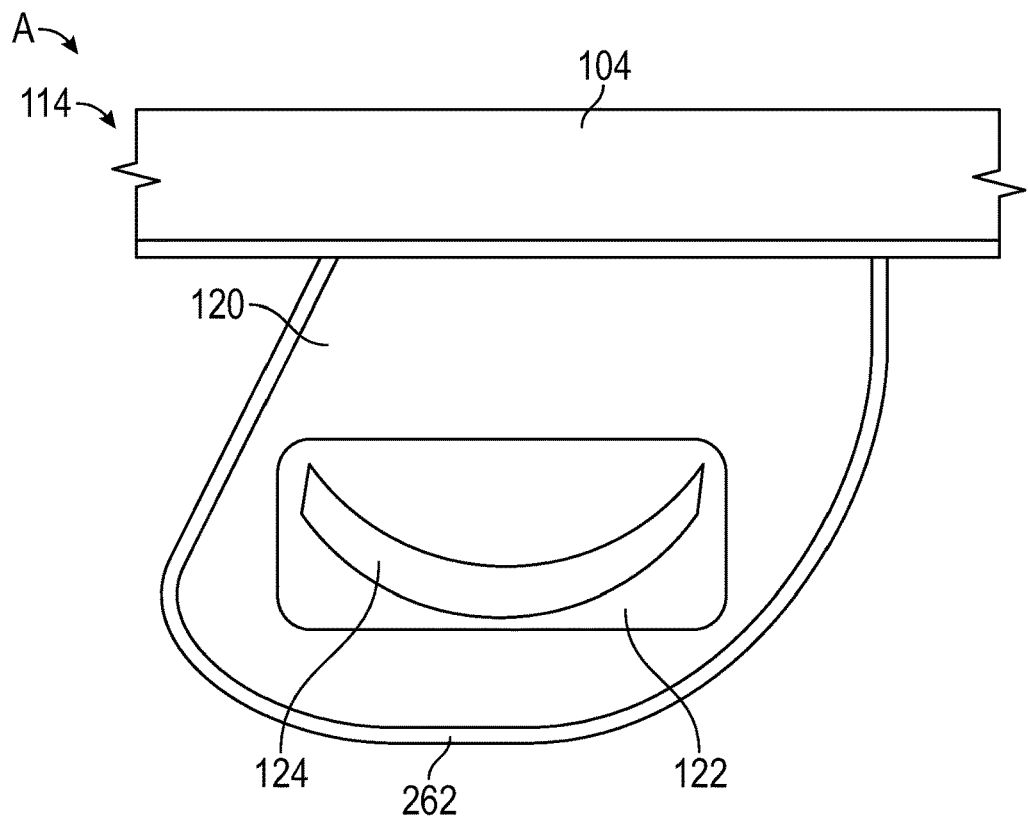
FIG. 3 is a top view of a first grip assembly of the material handling vehicle taken from region A of FIG. 2.

The clamp assembly 110 can include one or more electrical contacts. The electrical contacts can be configured to transfer power to a load on the material handling vehicle 100. For example, one of the first grip assembly 114 or the second grip assembly 116 can include at least one power contact. Turning to FIG. 3, a top view of the first grip assembly 114 is shown. The first grip assembly 114 may include a first lobe or clamping arm 120, a first mount 122, and a first power contact 124. The first mount 122 may be inserted into and supported by the first clamping arm 120. The first mount 122 may be generally flush with the first clamping arm 120. The first mount 122 may be constructed of an electrically insulating material (e.g., plastic, rubber, silicone, etc.).

The first power contact 124 can be configured to engage with corresponding contacts within a base of a load to transfer power from the power source 102 to the load. The first power contact 124 can be coupled to the first clamping arm 120 by the first mount 122 to electrically insulate the first power contact 124 from the first clamping arm 120. The first power contact 124 may be inserted into and supported by the first mount 122. In some embodiments, the first power contact 124 may be crescent-shaped, although other shapes are envisioned. The crescent or arcuate-shaped first power contact 124 can provide a wiping electrical contact. In the illustrated embodiment, the arc-shaped electrical contacts can enable the clamp assembly 110 to engage center walls of a loads having a variety of center wall thicknesses while maintaining electrical contact between the electrical contacts (e.g., first contact 124) and a corresponding electrical contact within a base of a load. In some embodiments, the arc of the electrical contacts can share a center of rotation with the rotation of the first and second grip assemblies 114, 116. The first power contact 124 may be constructed of an electrically conductive material (e.g., metal or carbon). In some embodiments, power contacts can be over-molded into the mounts, including wire leads that may lead to or from the power contacts. The first power contact 124 may be in electrical communication with the power source 102 and the controller 108. The controller 108 can be configured to selectively energize the first power contact 124 with power from the power source 102.

Figure 4:
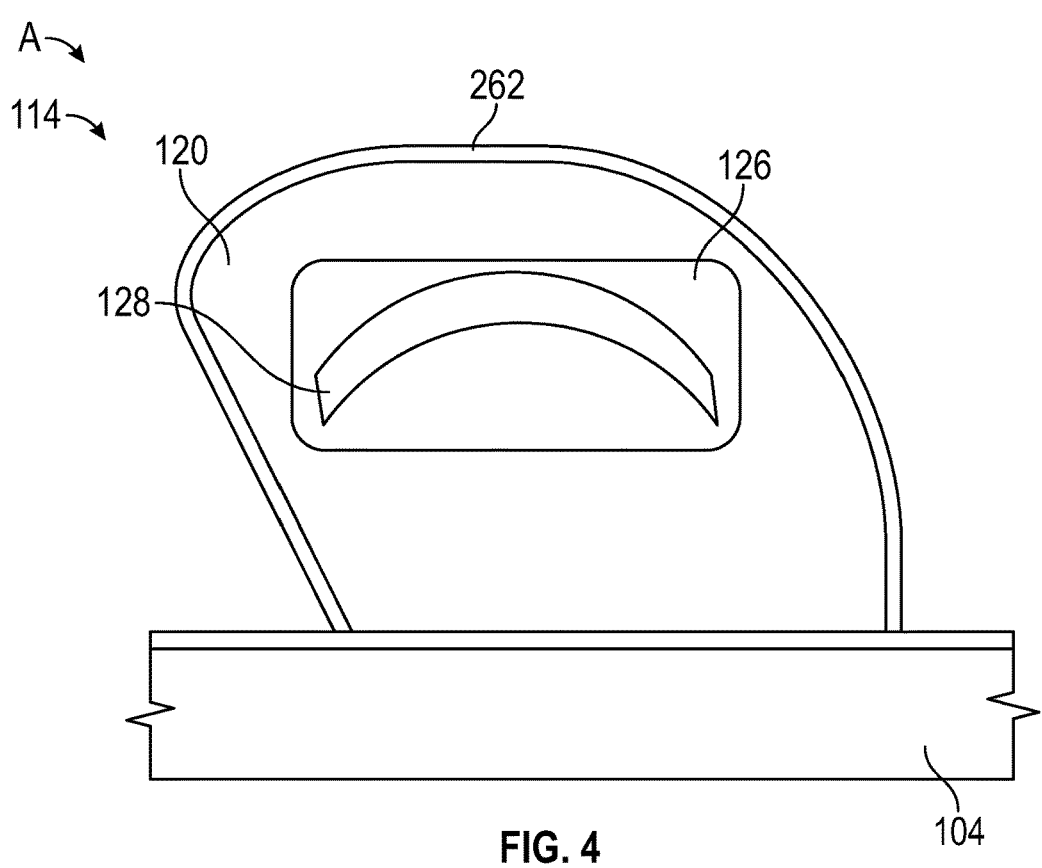
FIG. 4 is a bottom view of the first grip assembly.

With reference to FIG. 4, a bottom view of the first grip assembly 114 is shown. The first grip assembly 114 may also include a second mount 126 and a second power contact 128 opposite the first mount 122 and first power contact 124. In the illustrated embodiment, the bottom side of the first grip assembly 114 (FIG. 4) can be substantially similar to the top side (FIG. 3). Unless otherwise stated in the description below or illustrated in the figures, it is to be understood that the bottom of the first grip assembly 114 can be substantially similar, include similar structures, and perform similar functions as the top of the first grip assembly 114. For example, the second power contact 128 can be configured to engage with corresponding contacts within a base of a load to transfer power from the power source 102 to a load. The second mount 126 may be inserted into and supported by the first clamping arm 120. The second mount 126 may be generally flush with the first clamping arm 120. The second mount 126 may be constructed of the electrically insulating material and be configured to electrically isolate the second power contact 128 from the first clamping arm 120. The second power contact 128 may be inserted into and supported by the second mount 126. In some embodiments, the second power contact 128 may be a mirror image of the first power contact 124 and thus crescent-shaped. It is anticipated that the second power contact 128 may be constructed of the electrically conductive material. The second power contact 128 may be in electrical communication with the power source 102 and the controller 108. The controller 108 may selectively energize the second power contact 128. In some examples, the controller 108 may energize the second power contact 128 based on an input from an operator. The controller 108 can be configured to selectively energize the second power contact 128.

Figure 5:
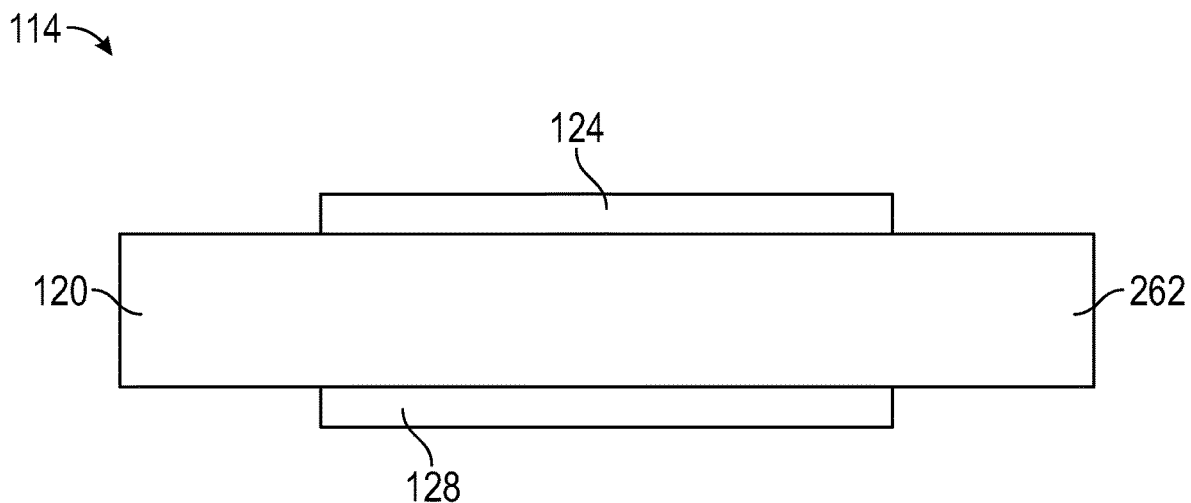
FIG. 5 is a side view of the first grip assembly.

Turning to FIG. 5, as seen in a side view, the electrical contacts can protrude from a surface of the clamping arms. In some embodiments, the electrical contacts can be arranged on opposing sides of the clamping arms. For example, in the illustrated embodiment, the first power contact 124 may be opposite the second power contact 128. The first power contact 124 and the second power contact 128 may extend away from the first clamping arm 120. In other words, the first power contact 124 and the second power contact 128 may project beyond or protrude from the first clamping arm 120. In some embodiments, a switch can be included to allow an operator to selectively turn on/off the power to the first power contact 124 and the second power contact 128.

The clamp assembly 110 can include one or more electrical contacts configured to transfer communication signals between a load on the material handling vehicle 100. For example, one of the first grip assembly 114 or the second grip assembly 116 can include at least one signal contact. The signal contacts can be configured to engage with corresponding contacts within a base of a load to communicate information or signals to/from the material handling vehicle 100 to the load.

Figure 6:
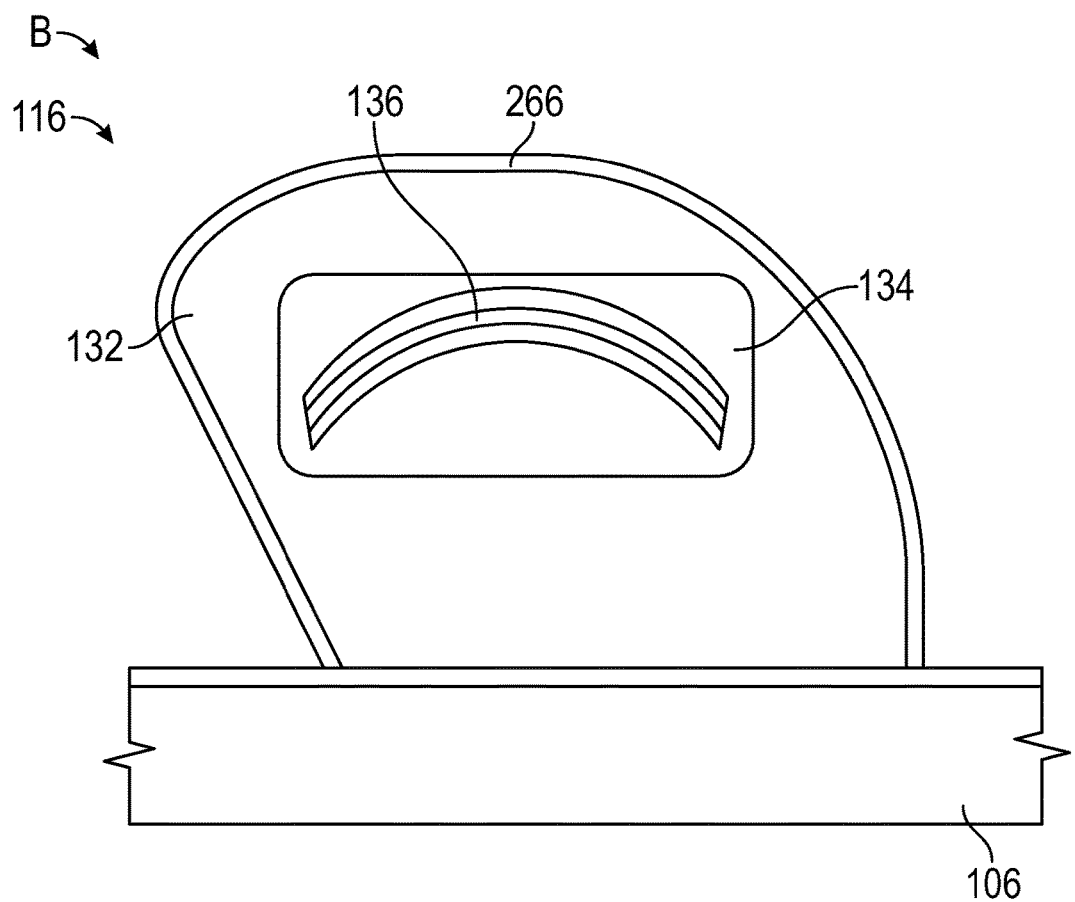
FIG. 6 is a top view of a second grip assembly of the example material handling vehicle taken from region B of FIG. 2.

Referring now to FIG. 6, a top view of the second grip assembly 116 is shown. The second grip assembly 116 may include a second lobe or clamping arm 132, a third mount 134, and a first signal contact 136. The third mount 134 may be inserted into and supported by the second clamping arm 132. The third mount 134 may be generally flush with the second clamping arm 132. The third mount 134 may be constructed of the electrically insulating material and be configured to electrically isolate the first signal contact 136 from the second clamping arm 132.

The first signal contact 136 may be inserted into and supported by the third mount 134. In some embodiments, the first signal contact 136 may be crescent-shaped, although other shapes are envisioned. The crescent or arcuate-shaped first signal contact 136 can provide a wiping electrical contact. The first signal contact 136 may be in electrical communication with the controller 108. In some embodiments, signal contacts can be over-molded into the mounts, including wire leads that may lead to or from the signal contacts.

Figure 7:
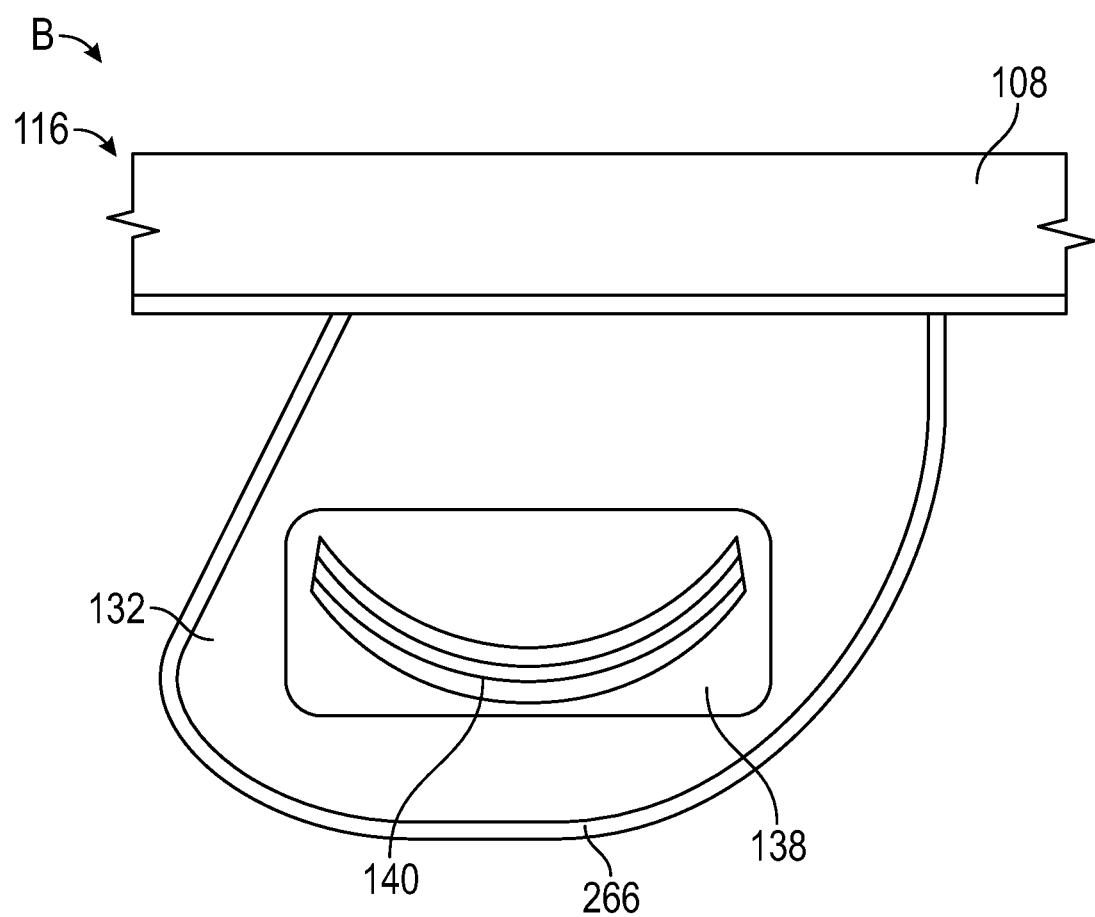
FIG. 7 is a bottom view of the second grip assembly.

With reference to FIG. 7, a bottom view of the second grip assembly 116 is shown. In the illustrated embodiment, the bottom side of the second grip assembly 116 (FIG. 7) can be substantially similar to the top side (FIG. 6). Unless otherwise stated in the description below or illustrated in the figures, it is to be understood that the bottom of the second grip assembly 116 can be substantially similar, include similar structures, and perform similar functions as the top of the second grip assembly 116. For example, the second grip assembly 116 may include a fourth mount 138 and a second signal contact 140. The fourth mount 138 may be inserted into and supported by the second clamping arm 132. The fourth mount 138 may be generally flush with the second clamping arm 132. The fourth mount 138 may be constructed of the electrically insulating material and be configured to electrically isolate the second signal contact 140 from the second clamping arm 132. The second signal contact 140 may be inserted into and supported by the fourth mount 138. In some embodiments, the second signal contact 140 may be a mirror image of the first signal contact 136 and thus crescent-shaped. The second signal contact 140 may be in electrical communication with the controller 108.

Figure 8:
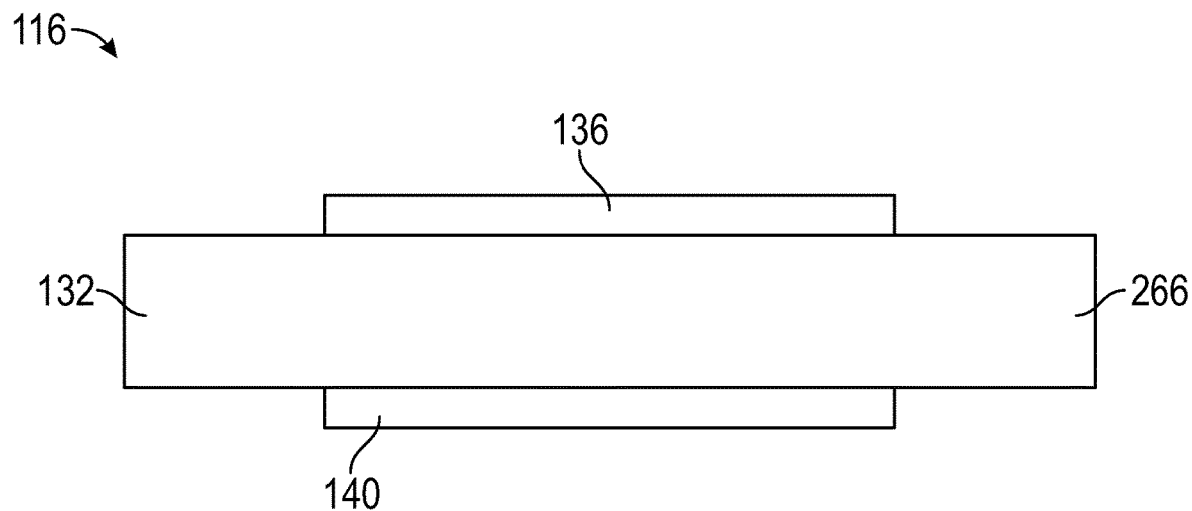
FIG. 8 is a side view of the first grip assembly.

Looking at FIG. 8, as seen in a side view, the first signal contact 136 may be opposite the second signal contact 140. The first signal contact 136 and the second signal contact 140 may extend away or protrude from the second clamping arm 132. In other words, the first signal contact 136 and the second signal contact 140 may project beyond the second clamping arm 132.

Figure 9:
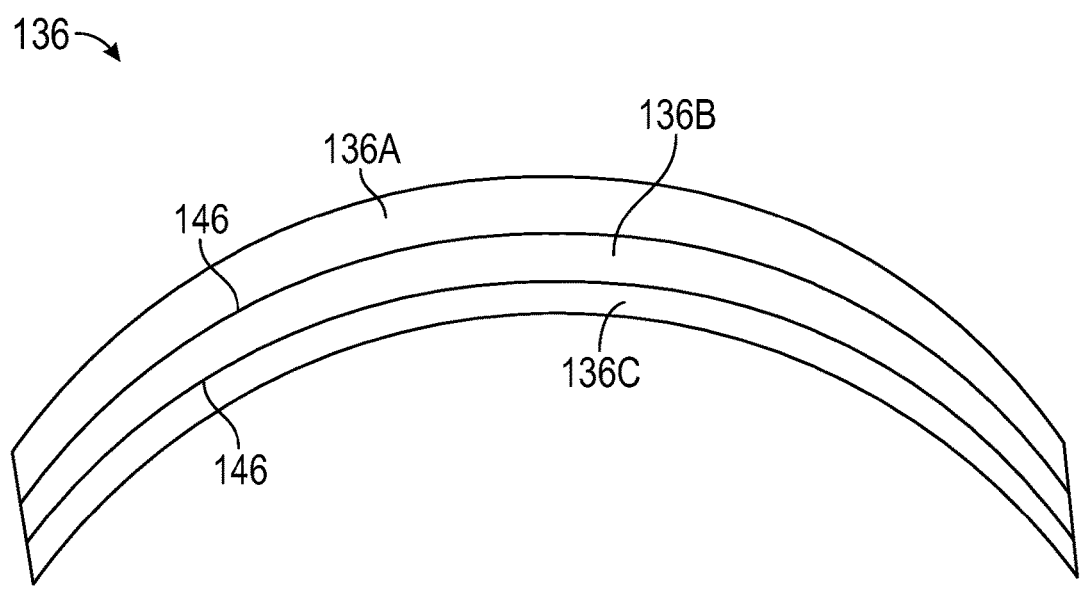
FIG. 9 is a top view of a first communication contact of the second grip assembly.

With reference to FIG. 9, the first signal contact 136 may include a plurality of signal contacts 136A, 136B, 136C, and a plurality of insulators 146. It is anticipated that the plurality of insulators 146 are constructed of the electrically insulating material. It is also anticipated that the plurality of signal contacts 136A-136C may be constructed of the electrically conductive material. The individual insulators of the plurality of insulators 146 may be alternatingly layered between individual tracks of the plurality of signal contacts 136A-136C. Thus, the plurality of insulators 146 may electrically isolate individual tracks of the plurality of signal contacts 136A-125C from one another. Looking back to FIGS. 6 and 7, it should be appreciated that the first signal contact 136 may be a mirror image of the second signal contact 140. Thus, the second signal contact 140 may also include a plurality of signal contacts and a plurality of insulators (140A-140C and 146, see FIG. 11).

As described above, in some embodiments, the clamp assembly 110 can include a plurality of signal contacts. The plurality of signal contacts can provide CAN signal communication capabilities. Typically CAN communication is two way communication based on the CAN standard which uses three signal contacts (e.g., CAN High, CAN Low, Ground-Return) and a fourth signal contact (e.g., Engage). The "engage" signal contact can be used as a signal to indicate that a clamp assembly has engaged a load.

In some embodiments, the controller 108 can be configured to selectively energize one or more of the power contacts or signal contacts on the first grip assembly 114 or the second grip assembly 116 based on system checks of the material handling vehicle 100. In some embodiments, the material handling vehicle 100 may be equipped with one or more sensors and the controller 108 may be in electrical communication with the sensors to perform system checks on the material handling vehicle 100.

In some embodiments, the controller 108 can be configured to perform an engagement system check that can include determining whether a load is correctly engaged by the forks 103, 105 or the clamp assembly 110. In such embodiments, the controller 108 may apply power and make one or more attempts to communicate with the load via the power contacts or signal contacts. The power applied may be limited by a fuse or circuit breaker on the material handling vehicle 100. If the controller 108 does not receive expected responses (e.g., CAN bus messages) to the communication attempt, the system check may indicate that the load is not correctly engaged by the clamp assembly 110.

In some embodiments, a disengagement system check may include determining whether a load is correctly disengaged by the clamp assembly 110. In such embodiments, the controller 108 may continue to communicate with a load after the material handling vehicle 100 has attempted to disengage from the load. If communication persists (e.g., via the power or signal contacts), the system check may indicate that the load is not correctly disengaged. It should be appreciated that the controller 108 may alert an operator that the load remains engaged before the material handling vehicle 100 drives away.

In some embodiments, a status system check may include interrogating a load for status information (e.g., via the signal contacts). In such embodiments, the controller 108 may query the load for a load identity, failure codes for the machinery on the load, and the load's status. Additionally, based on the status information, the controller 108 may instruct the load to perform one or more operations (e.g., rotate a bin or actuate a carousel).

In some embodiments, a loading system check may include interrogating a load for item loading information. In such embodiments, the controller 108 may query sensors (e.g., bar code scanners, 2D bar codes processors, RFID chips, location detectors, etc.) mounted on the load to monitor items loaded or removed from the load. The controller 108 may alert the operator to any item count defects when the load is engaged.

In some embodiments, a power draw system check may include monitoring, with the controller 108, electrical power drawn by a load. It should be understood that the above-described system checks are non-limiting examples and that the controller 108 may perform any type of system check.

It is to be understood by one of ordinary skill in the art that the clamp assembly described herein, or the power and signal contacts provided thereon, could be retrofit into trucks with pre-existing pallet clamps, or the clamp assembly described herein could be a direct replacement for the pallet clamp on pallet clamp equipped material handling vehicles.

Figure 10:
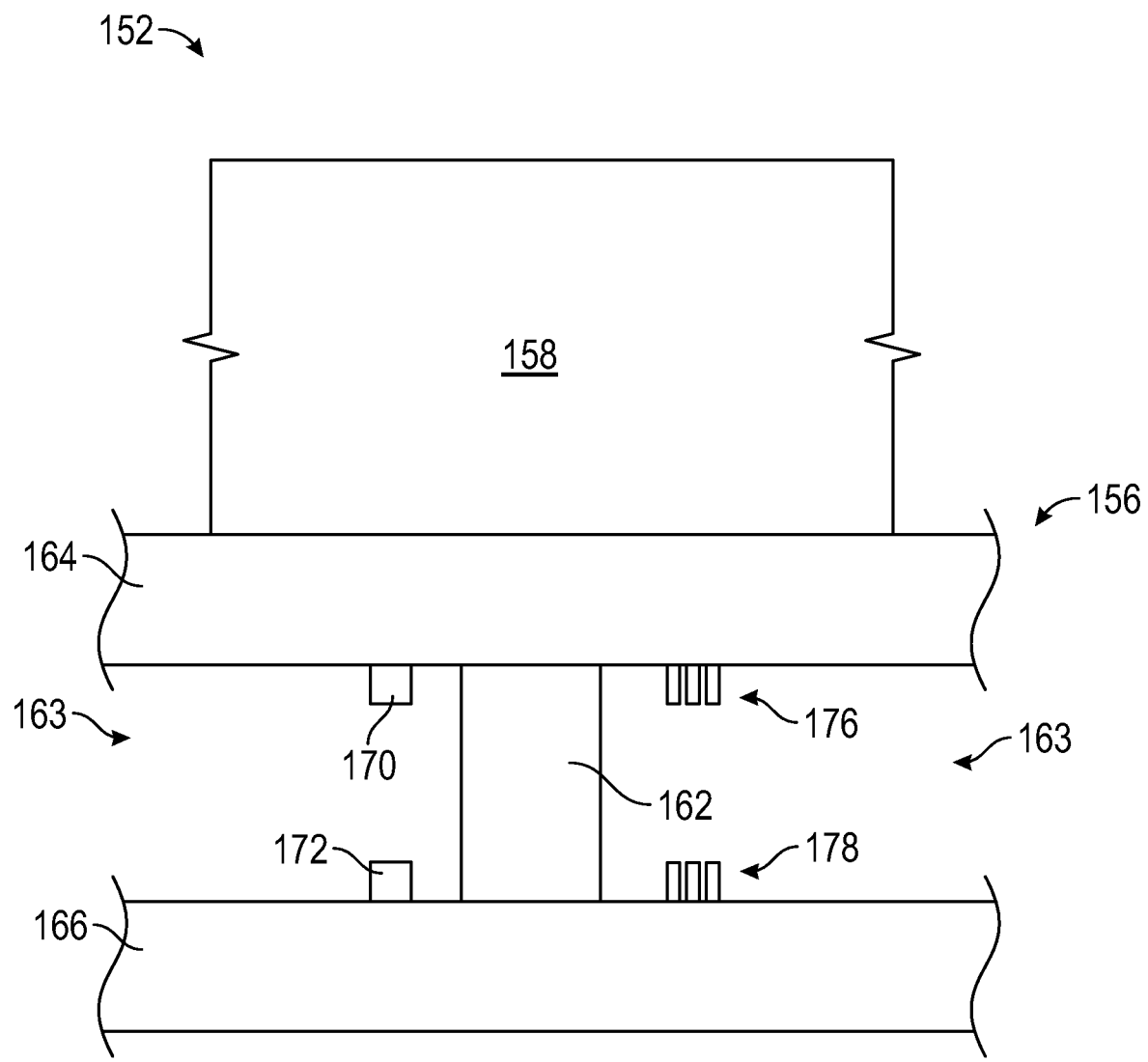
FIG. 10 is a partial side view of a load with a base according to one aspect of the present disclosure.

Turning to FIG. 10, one embodiment of a load assembly with a base is shown. The load assembly 152 may include a base 156 and a load 158. The base 156 may support the load 158. In some embodiments, the base 156 can be a pallet, or be similar in shape and structure to a pallet. For example, the base 156 may include a center wall 162 (e.g., a center stringer of a pallet), a top plank or wall 164, and a bottom plank or wall 166 opposite the top wall 164. A spacing formed between the top wall 164 and the bottom wall 166 can be divided by the center wall 162 to form fork pockets 163. The fork pockets 163 can be configured to receive the first and second forks 103, 105 (see FIG. 2) of the material handling vehicle 100.

The base 156 can include electrical contacts configured to engage with the electrical contacts on the clamp assembly 110 to transfer power or communication signals between the power source 102 and the controller 108 to the load 158. In some embodiments, the base 156 can include a plurality of electrical contacts that correspond and engage with the plurality of electrical contacts on the clamp assembly 110.

The electrical contacts can protrude from a surface of the base 156 into a cavity formed by the fork pockets 163. In the illustrated embodiment, the base 156 can include one or more electrical contacts configured to transfer power to the load 158. For example, one of the top wall 164 or the bottom wall 166 can include at least one power contact configured to engage with one of the first or second power contacts 124, 128 of the clamp assembly 110. The base 156 can also include one or more electrical contacts configured to transfer communication signals between the controller 108 and the load 158. For example, one of the top wall 164 or the bottom wall 166 can include at least one signal contact configured to engage with one of the first or second signal contacts 136, 140 of the clamp assembly 110. In the illustrated embodiment, the base 156 can include a first power pin 170, a second power pin 172, first signal pins 176, and second signal pins 178. In the illustrated embodiment, the center wall 162 separates first power pin 170 and the first signal pins 173 from the second power pin 172 and the second signal pins 178. Said another way, the first power pin 170 and the first signal pins 173 are arranged within one of the fork pockets 163 and the second power pin 172 and the second signal pins 178 are arranged in the other fork pocket 163.

The center wall 162 may be connected to the top wall 164 and the bottom wall 166 and be configured to be received within and engaged by the clamp assembly 110 (see FIG. 2). The first power pin 170 and the first signal pins 176 may extend from the top wall 164 toward the bottom wall 166. The first power pin 170 and/or the first signal pins 176 may be slidably engaged with the top wall 164. In some embodiments, the first power pin 170 and/or the first signal pins 176 may be spring-loaded relative to the top wall 164 such that the first power pin 170 and the first signal pins 176 are biased away from the top wall 164. The second power pin 172 and the second signal pins 178 may extend from the bottom wall 166 toward the top wall 164. The second power pin 172 and the second signal pins 178 may be slidably engaged with the bottom wall 166. In some embodiments, the second power pin 172 and the second signal pins 178 may be spring-loaded relative to the bottom wall 166 such that the second power pin 172 and the second signal pins 178 are biased away from the bottom wall 166. The center wall 162 may be arranged between the first power pin 170 and the first signal pins 176. The center wall 162 may be arranged between the second power pin 172 and the second signal pins 178.

Looking further at FIG. 10, the first power pin 170, the second power pin 172, the first signal pins 176, and the second signal pins 178 may be in electrical communication with the load 158. The first power pin 170 and the second power pin 172 may be sized and configured to provide electrical energy to the base 156 and/or the load 158 (e.g., to support a refrigeration compressor, run a fan, illuminate a lamp, actuators, carousels, lights, etc.), from the power source 102 on the material handling vehicle 100 when the clamp assembly 110 is engaged with the center wall 162.

Figure 11:
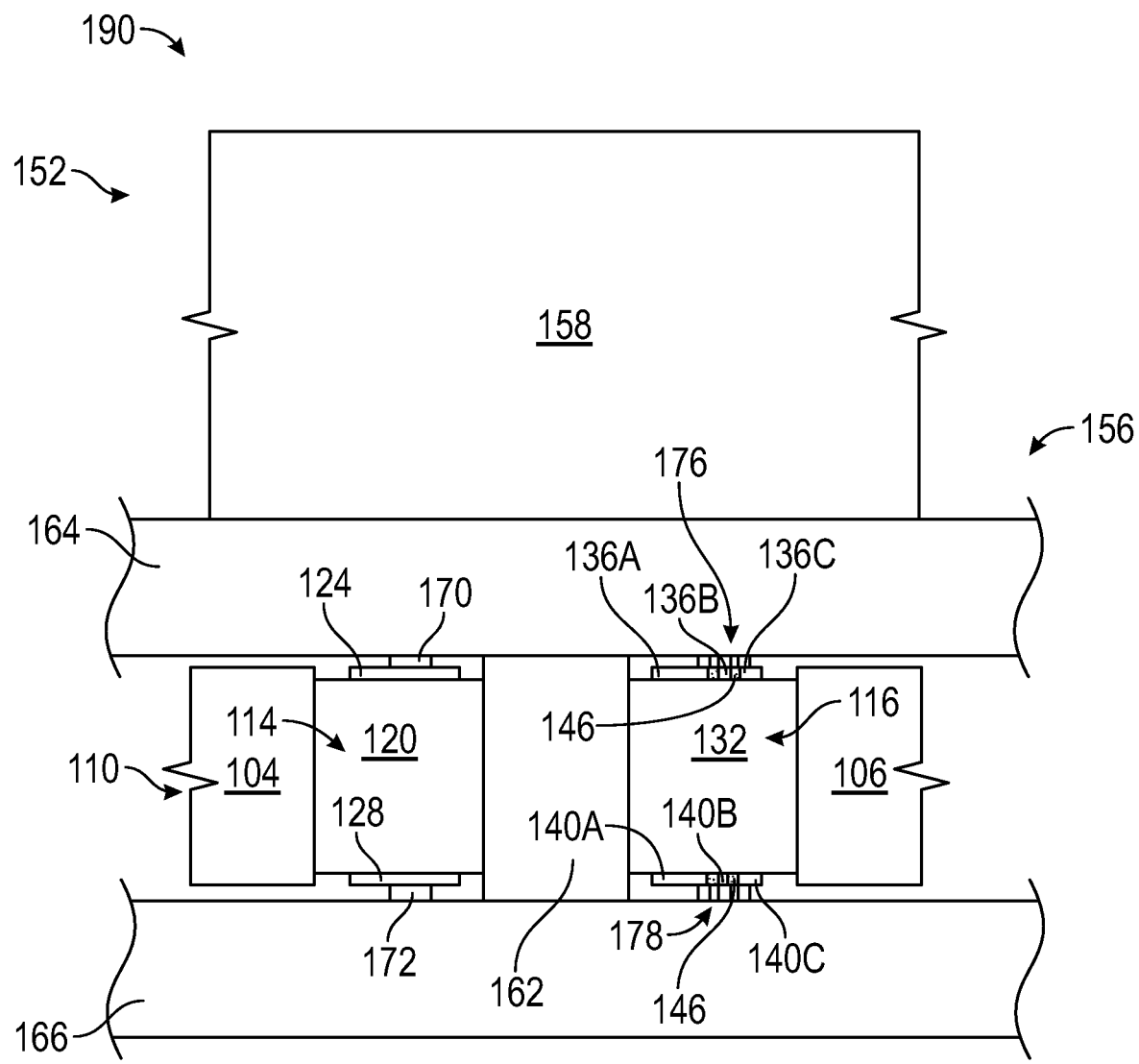
FIG. 11 is a partial side view of a clamp assembly of the material handling vehicle engaged with the base of the load.

With reference to FIG. 11, the clamp assembly 110 is illustrated as being engaged with the base 156. The first signal pins 176 and the second signal pins 178 may be sized and configured to transmit information between the base 156 and/or the load 158 and the controller 108 on the material handling vehicle 100 when the clamp assembly 110 is engaged with the center wall 162. The information may include, for example, an internal temperature of the load 158, inertial movement data of base 156 and/or the load 158, location data of base 156 and/or the load 158, a time since the load 158 was opened, etc. The first signal pins 176 and the second signal pins 178 may be sized and spaced relative to one another to correspondingly contact one or more signal contacts among the plurality of signal contacts 140A-140C on the clamp assembly 110.

Referring again to FIG. 11, in operation, the first arm portion 104 and the second arm portion 106 of the clamp assembly 110 may be inserted between the top wall 164 and the bottom wall 166 such that the center wall 162 may be received between the first grip assembly 114 and the second grip assembly 116. The controller 108 may instruct the first grip assembly 114 to pivot outwardly relative to the first arm portion 104 and the second grip assembly 116 to pivot outwardly relative to the second arm portion 106 to actuate the first and second grip assemblies 114, 116 from a stowed position to a deployed or clamped position. In other words, the controller 108 may selectively pivot the first grip assembly 114 relative to the first arm portion 104 and the second grip assembly 116 relative to the second arm portion 106 to grip and secure the center wall 162. Thus, the center wall 162 may be compressed and gripped firmly between the first clamping arm 120 and the second clamping arm 132, thereby securing the base 156, and thus the load, 158, to the material handling vehicle 100. The material handling vehicle 100 and the base 156 may be collectively referred to as a material handling system 190.

In instances when the first grip assembly 114 pivots outwardly relative to the first arm portion 104, the first power contact 124 may contact and slidably sweep against the first power pin 170. Thus, the first power contact 124 may depress the first power pin 170 into the top wall 164 and the first power contact 124 may be placed in electrical communication with the first power pin 170. In instances when the first grip assembly 114 may pivot outwardly relative to the first arm portion 104, the second power contact 128 may contact and slidably sweep against second power pin 172. Thus, the second power contact 128 may depress the second power pin 172 into the bottom wall 166 and the second power contact 128 may be placed in electrical communication with the second power pin 172.

In instances when the second grip assembly 116 pivots outwardly relative to the second arm portion 106, the first signal contact 136 may contact and slidably sweep against the first signal pins 176. Thus, the first signal contact 136 may depress the first signal pins 176 into the top wall 164 and the first signal contact 136 may be placed in electrical communication with the first signal pins 176. In instances when the second grip assembly 116 pivots outwardly relative to the second arm portion 106, the second signal contact 140 may contact and slidably sweep against the second signal pins 178. Thus, the second signal contact 140 may depress the second signal pins 178 into the bottom wall 166 and the second signal contact 140 may be placed in electrical communication with the second signal pins 178. Thus, the controller 108 may electronically send and receive information to and from the base 156 and/or the load 158 via the first signal contact 136 and/or the second signal contact 140.

Figure 12:
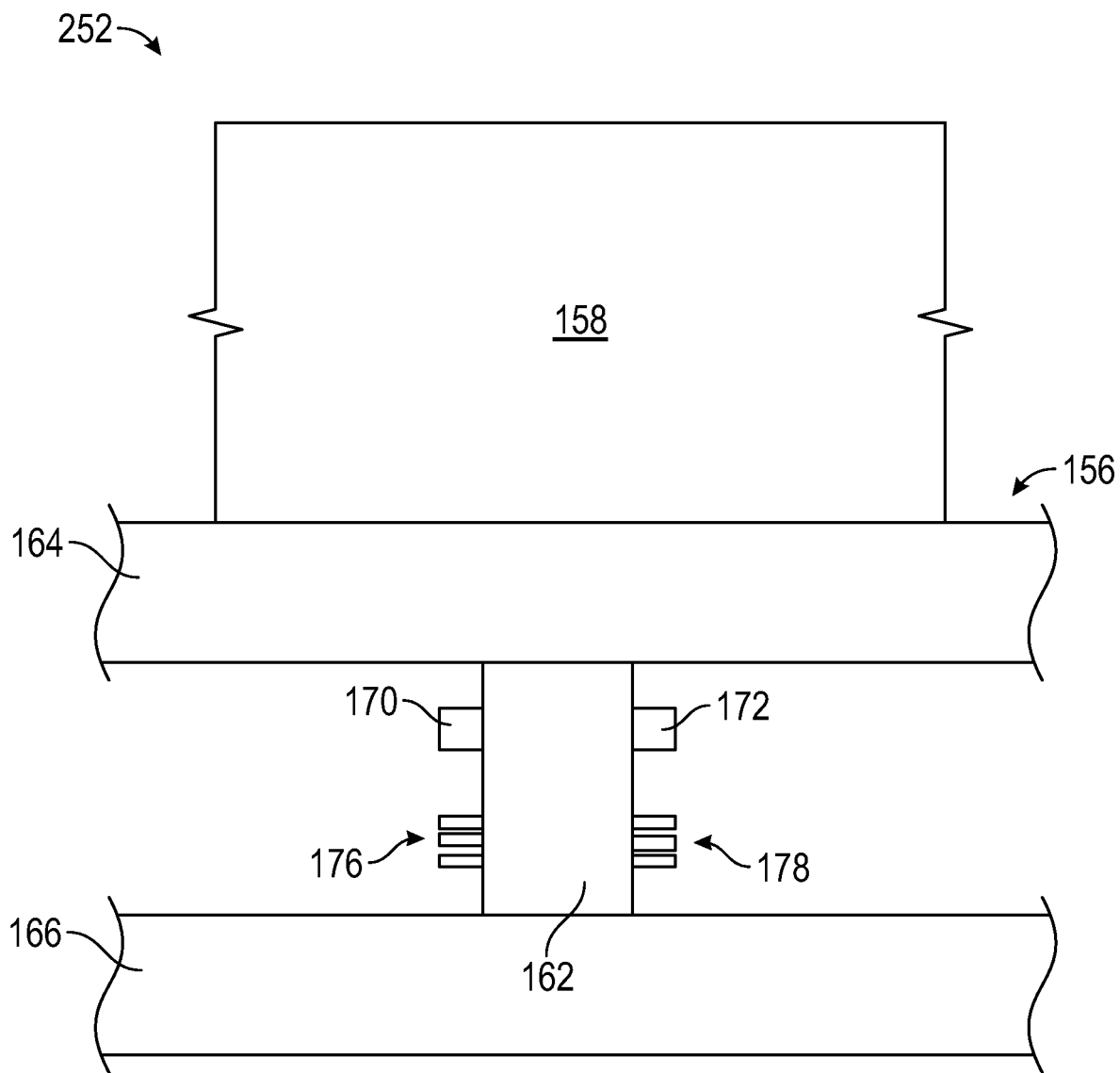
FIG. 12 is a partial side view of a second embodiment of a load.

Turning to FIG. 12, a second embodiment of a load assembly with a pallet or pallet-like base is shown. The load assembly 252 may be an alternative arrangement of the load assembly 152 of FIGS. 10 and 11. In general, the second embodiment of the load assembly 252 can be substantially similar to the load assembly 152 of FIGS. 10 and 11, with the exception that the power and signal contacts are located along the center wall 162 as opposed to the top and bottom walls 164, 166. The load assembly 252 may include the base 156 and the load 158. The base 156 may support the load 158. Additionally, the base 156 may include the center wall 162, the top wall 164, the bottom wall 166, the first power pin 170, the second power pin 172, the first signal pins 176, and the second signal pins 178.

The center wall 162 may be connected between the top wall 164 and the bottom wall 166. In contrast with the load assembly of FIGS. 10 and 11, any of the first power pin 170, the second power pin 172, the first signal pins 176, and/or the second signal pins 178 may extend outwardly from the center wall 162 between the top wall 164 and the bottom wall 166, perpendicular to the center wall 162. Any of the first power pin 170, the second power pin 172, the first signal pins 176, and the second signal pins 178 may be slidably engaged with and spring-loaded relative to the center wall 162. The first power pin 170 and the second power pin 172 may extend oppositely from one another. The first signal pins 176 and the second signal pins 178 may extend oppositely from one another. The center wall 162 may be between the first power pin 170 and the second power pin 172. The center wall 162 may be between the first signal pins 176 and the second signal pins 178.

Looking further at FIG. 12, the first power pin 170, the second power pin 172, the first signal pins 176, and the second signal pins 178 may be in electrical communication with the load 158. The first power pin 170 and the second power pin 172 may be sized and configured to provide electrical energy to the base 156 and/or the load 158 (e.g., to support a refrigeration compressor, run a fan, illuminate a lamp, etc.), from the power source 102.

In general, the clamp assembly 110 can be altered or arranged in an alternative embodiment in order for the power and signal pins to engage with the load assembly 252 of FIGS. 10 and 11. For example, referring back to FIG. 5, as seen in a side view, the first clamping arm 120 may include a first side 262 facing towards the second clamping arm 132. Additionally or alternatively, the first clamping arm 120 may include a third power contact and a third signal contact mounted along the first side 262 (not shown). The third signal contact may include a plurality of signal contacts and a plurality of insulators. It is anticipated that the third power contact and the third signal contact may be constructed of the electrically conductive material and mounted in the electrically insulating material. The third power contact may be in electrical communication with the power source 102 and the controller 108. The controller 108 may selectively energize the third power contact. The third signal contact may be in electrical communication with the controller 108.

The third power contact and the third signal contact may extend laterally away from the first clamping arm 120. In other words, the third power contact and the third signal contact may project beyond the first side 262. A switch can be included to allow the operator to turn on the power to third power contact and the third signal contact. The first clamping arm 120 may operate with the load assembly 252 of FIG. 12 via the third power contact and the third signal contact. In operation, the third power contact may contact and compress the first power pin 170 and the third signal contact may contact and compress the first signal pins 176.

Referring back to FIG. 8, as seen in a side view, the second clamping arm 132 may include a second side 266 facing towards the first clamping arm 120 and opposite the first side 262. Additionally or alternatively, the second clamping arm 132 may include a fourth power contact and a fourth signal contact mounted along the second side 266 (not shown). The fourth signal contact may include a plurality of tracks and a plurality of insulators. It is anticipated that the fourth power contact and the fourth signal contact may be constructed of the electrically conductive material and mounted in the electrically insulating material. The fourth power contact may be in electrical communication with the power source 102 and the controller 108. The controller 108 may selectively energize the fourth power contact. The fourth signal contact may be in electrical communication with the controller 108.

The fourth power contact and the fourth signal contact may extend laterally away from the second clamping arm 132. In other words, the fourth power contact and the fourth signal contact may project beyond the second side 266. The switch may allow the operator to turn on the power to fourth power contact and the fourth signal contact. The second clamping arm 132 may operate with the load assembly 252 of FIG. 12 via the fourth power contact and the fourth signal contact. For example, in operation, the fourth power contact may contact and compress the second power pin 172. Additionally, in operation, the fourth signal contact may contact and compress the second signal pins 178.

As previously described herein, the clamp assembly 110 (see FIG. 2) can enable a material handling vehicle to provide power and/or communication signals to a load 158 (see FIG. 11) For example, the load 158 cab be a load-supporting container, a material sorting system, etc. The load can have a base configured to receive the power and/or communication signals from the material handling vehicle. As previously described herein, the load can be embodied in various ways. As will be described below, a material sorting system can be coupled to a base that can be engaged by a material handling vehicle.

In large storage warehouses storing objects, such as consumer goods to be purchased, the goods may be retrieved from shelving racks, and the like, and sorted prior to shipping out to a purchasing consumer. To retrieve and organize these goods, conventional "put walls" and order-picking carts are typically used. However, these conventional "put walls" are stationary and order-picking carts are manually pushed around by the worker. Further, conventional order-picking typically consists of a worker placing items onto a pallet or into a cart.

The present disclosure provides a material sorting system that can be configured to travel or be moved within a warehouse to a location of a stored good. The material sorting system can be configured to operatively attach to a material handling vehicle. The operative attachment can include an electrical attachment, such as the clamp assembly previously described herein (See FIG. 1), with electrical power and/or electronic communication contacts described above.

In some embodiments, the material sorting system can be driven with an internal drive system and can be configured to be driven autonomously or by an operator. In some embodiments, the material sorting system can indicate a predetermined location within the material sorting system for the good to be stored. In some embodiments, the material sorting system can be a carousel with storage racks or containers movable along a track of the carousel. In some embodiments, the track can be vertically oriented relative to the ground. In other embodiments, other track orientations are contemplated, such as horizontal or rotary tracks. For example, certain features and combinations of features that are presented with respect to particular embodiments in the discussion above can be utilized in other embodiments and in other combinations, as appropriate. As will be described herein, order-picking can be improved when using the material sorting system described herein. For example, the systems and methods described herein can increase the put density. This can allow an operator or worker to fulfill more orders. Ergonomics can also be improved, for example, as a carousel system can position the appropriate tote or box in an area, height, or position that is convenient for the worker.

Figure 13:
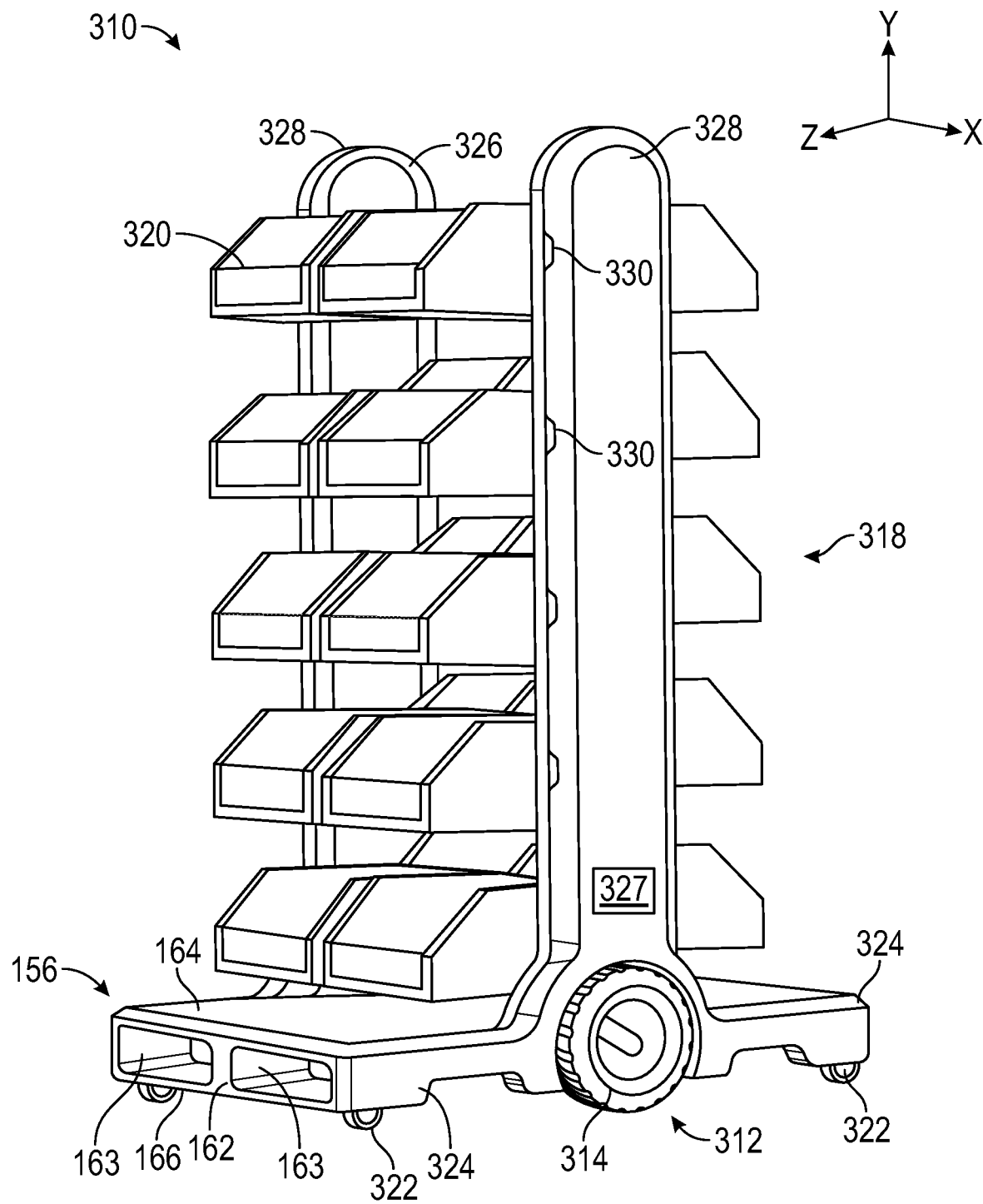
FIG. 13 is a perspective view of a material sorting system according to one aspect of the present disclosure.

Referring to FIG. 13, a material sorting system 310 can be coupled to the base 156 (see FIGS. 10-12). The material sorting system 310 can include a carousel assembly 318.

In the illustrated embodiment, the base 156 can include a drive system 312. The drive system 312 can operate wheels 314 to move the base 356 and carousel assembly 318 in a forward and a backward direction along the Z-axis as provided on FIG. 13. The drive system 312 can be configured to rotate the wheels 314 in opposite directions to rotate the base 156 about the Y-axis, for example, similar to tank-steering. The drive system 312 can be powered by an onboard power supply (e.g., one or more batteries). Caster wheels 322 can be attached to the base 156, shown here at corners 324 of the rectangular-shaped base 156, and can provide additional support and stability for the material sorting system 310 when the base 156 is not being carried by a material handling vehicle.

Figure 14:
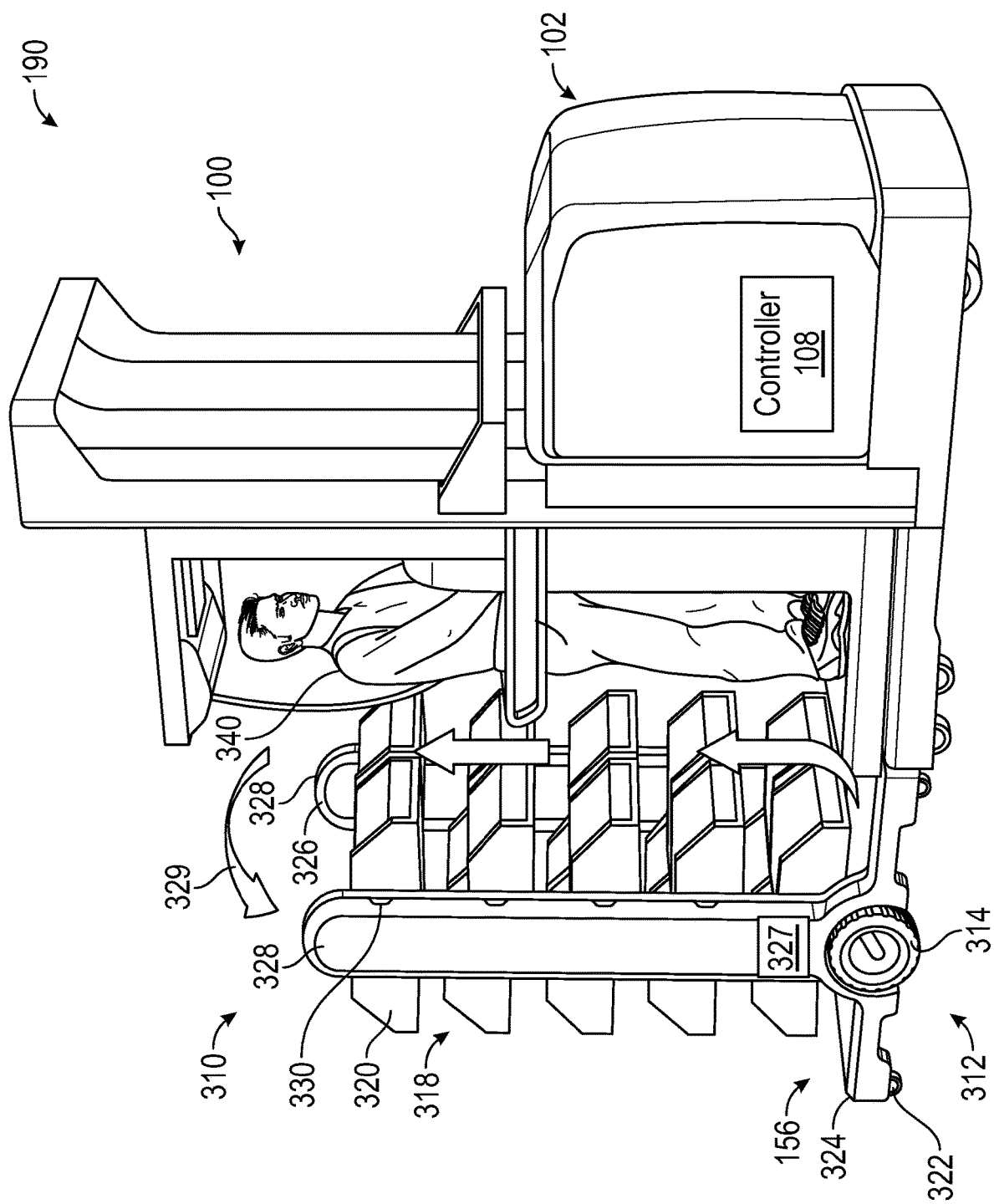
FIG. 14 is a perspective view of the material sorting system of FIG. 1 operatively connected to the material handling vehicle of FIG. 2.

As previously described herein, the base 156 can be sized and shaped similarly to a pallet and can be configured to interface with a material handling vehicle. For example, the base 156 can have a center wall 162 and openings or fork pockets 163 to each side of the center wall 162. As best illustrated in FIG. 14, the material handling vehicle 100 (e.g., a high-lift forklift) can include a pair of forks (not shown, see FIG. 1) configured to be received within the fork pockets 163 of the base 156. The fork pockets 163 in the base 156 can enable a material handling vehicle to carry and move the material sorting system 310. As previously noted herein, the configuration of the material handling vehicle engaged with the base 156 can be referred to as a material handling system 190. In some embodiments, the base 156 can take other shapes and configurations. For example, the base 156 can be substantially circular. In an autonomous embodiment, a circular base may be advantageous and provide better maneuverability.

The carousel assembly 318 can be a vertical carousel and include one or more storage units configured to be movable relative to the base 156 to receive goods picked by an order-picker. In the illustrated embodiment, the carousel assembly includes a plurality of storage units 320 movable along tracks 326 on a set of opposing stalks 328 that are coupled to the base 156. In the illustrated embodiment, the carousel assembly 318 can include an actuation mechanism 327 operatively coupled to the tracks 326 and configured to move the plurality of storage units 320 along the tracks 326. In some embodiments, the actuation mechanism 327 can include an electric motor configured to drive a belt, chain, or gear drive system (not shown) configured to move the plurality of storage units 320 along the tracks 326. In other embodiments, the actuation mechanism 327 may include a linear actuator or any other mechanical, electrical, or hydraulic mechanism that is capable of moving the plurality of storage units 320. The stalks 328 can be coupled to and extend upward from the base 156. In the illustrated embodiment, the stalks 328 can be arranged substantially over the wheels 314 and extend vertically along the Y-axis. The location of the stalks 328 over the wheels 314 can distribute the weight of the carousel assembly 318 more directly onto the wheels 314 in a direction substantially perpendicular to the ground (e.g., the direction of the y-axis). This arrangement can enhance stability and control of the material sorting system 310.

It is contemplated that although the tracks 326 can provide a continuous path for the storage units 320 to traverse along the stalks 328. In some embodiments, there can be provided distinct stop locations along the continuous path. The stalks 328 can further include indicators 330 at the distinct stop locations along the stalks 328. The indicators 330 can be lights or other identifying indicia and can provide information to an operator 340. In some embodiments, the indicators 330 can be multi-color lights. For example, during operation, the indicators 330 can be normally illuminated red lights. In order to indicate placement of a good into one of the plurality of storage units 320 at one of the distinct stop locations, one of the indicators 330 corresponding to the respective storage unit 320 can be illuminated green to alert the operator to the respective storage bin 320 to place the picked goods. Other embodiments using indicators along the stalks 328 to designate placement of a good within a specific storage unit 320 are also within the purview of this disclosure. In some embodiments, each of the plurality of storage bins 320 can include an indicator to designate the placement of a good within a specific storage unit 320. In some embodiments, each of the plurality of storage bins 320 can include a smart barcode tag. The smart barcode tag can integrate with a controller or warehouse management system to designate the placement of a good within a specific storage unit 320.

FIG. 14 illustrates an example movement of the storage units 320 along the stalks 328 (as shown by arrows 329). The storage units 320 can be configured to be accessible along the entire length of the tracks 326. As shown in FIG. 14, the actuation mechanism 327 can be configured to move the storage units 320 nearest the operator 340 in an upward direction relative to the base 156. It should understood that the direction of motion can be reversed to move the storage units 320 nearest the operator 340 in a downward direction relative to the base 156 as well (e.g., the motor of an actuation mechanism can be reversed). The movement of the storage units 320 can be automated (i.e., programmed to locate a specific storage unit 320 at a specific distinct stop location depending on an input, remote or local), mechanically driven and controlled by an operator using a switch or control panel, or manually moved around the tracks 326 by an operator. As described below, the carousel assembly 318 can be powered by the power supply 102 on the material handling vehicle 100 via electrical contacts on a clamp assembly, which can also provide power to the drive system 312 and/or the actuation mechanism 327. In some embodiments, the carousel assembly 318 can include a separate power supply (not shown).

Referring back to FIG. 11, the base 156 can include one or more electrical contacts configured to receive power or communication signals from corresponding electrical contacts on a clamp assembly 110. As previously described herein, the clamp assembly 110 can be configured to deliver power and communication signals from the material handling vehicle 100, such as the material handling vehicle illustrated in FIG. 14, to the material sorting system 310 illustrated in FIG. 14 via the one or more electrical contacts within the base 156. The clamp assembly 110 can be positioned between a pair of forks on the material handling vehicle and can include a first grip arm or assembly 114, and a second grip arm or assembly 116. The first and second grip assemblies 114, 116 can include at least one power contact (e.g., first and second power contacts 124, 128). In some embodiments, the first and second grip assemblies 114, 116 can include at least one signal contact (e.g., first and second signal contacts 136, 140). Additional power and signal contacts or alternative arrangements of the power and signal contacts are contemplated (see, e.g., FIG. 12).

As previously described herein, the first and second grip assemblies 114, 116 can be configured to selectively and removably engage both sides of the base 156 via the center wall 162 when the pair of forks are received within the fork pockets 163. At the location of engagement, electrical contacts can be provided in the base 156 within either or both of the fork pockets 163 and can be configured to electrically contact with either or both of the power and signal contacts (e.g., first and second power contacts 124, 128 and/or first and second signal contacts 136, 140). For example, the base 156 can include a first power pin 170, a second power pin 172, first signal pins 176, and second signal pins 178 within the fork pockets 163 and adjacent to the center wall 162. When in electrical contact, electrical power and communications can be transferred between the material handling vehicle 100 and the material sorting system 310.

The carousel assembly 318, including the actuation mechanism 327 and the indicator lights 330, can be in electrical communication with one or more of the first and second power pins 170, 172 and first and second signal pins 176, 178. For example, the carousel assembly 318 can receive power from the first and second power pins 170, 172 when power is provided from an external source. In operation, when the clamp assembly 110 of the material handling vehicle is engaged with the base 156, the carousel assembly 318 can be powered by the power supply 102 on the material handling vehicle 100 via the first and second power pins 170, 172. The carousel assembly 318 can also receive communication and/or command signals from the first and second signal pins 176, 178. In operation, when the clamp assembly 110 of the material handling vehicle is engaged with the base 156, the carousel assembly 318 can receive communication and/or command signals from the controller 108 on the material handling vehicle 100 via the first and second signal pins 176, 178.

As noted above, the actuation mechanism 327 of the carousel assembly can be in electrical communication with one or more of the first and second power pins 170, 172 and first and second signal pins 176, 178. For example, when the clamp assembly 110 of the material handling vehicle is engaged with the base 156, the actuation mechanism 327 can receive power from the power source 102 on the material handling vehicle via the first and second power pins 170, 172. The actuation mechanism 327 can also receive communication and/or command signals from the first and second signal pins 176, 178. In operation, when the clamp assembly 110 of the material handling vehicle is engaged with the base 156, the actuation mechanism 327 can receive communication signals from the controller 108 on the material handling vehicle to issue actuation commands. The actuation commands can include positioning the plurality of storage units 320 in the distinct stop locations along the tracks 326 of the carousel assembly 318.

Similarly, the indicators 330 of the carousel assembly can be in electrical communication with one or more of the first and second power pins 170, 172 and first and second signal pins 176, 178. For example, when the clamp assembly 110 of the material handling vehicle is engaged with the base 156, the indicators 330 can receive power from the power source 102 on the material handling vehicle via the first and second power pins 170, 172 to turn on/off the indicator lights. The indicators 330 can also receive communication and/or command signals from the first and second signal pins. In operation, when the clamp assembly 110 of the material handling vehicle is engaged with the base 156, the indicators 330 can receive communication signals from the controller 108 on the material handling vehicle to issue illumination commands (e.g., to change colors of the indicators 330, etc.).

As detailed above, the controller 108 on the material handling vehicle 100 can actuate and control the material sorting system 310. In some embodiments, the material handling system 190, including the material handling vehicle 100 and the material sorting system 310, can be utilized with a warehouse management system (not shown). The warehouse management system can generate and issue a pick command to the operator 340 of the material handling vehicle 100 (e.g., via a personal or handheld device) and simultaneously to the controller 108 of the material handling vehicle 100. This pick command can be transmitted to the material sorting system 310 via the electrical contacts within the clamp assembly 110 (see FIG. 11), when the clamp assembly 110 is engaged with the base 156 and in electrical communication with the electrical contacts within the base 156. Upon the controller 108 receiving the pick command, the controller can trigger the actuation mechanism 327 on the material sorting system 310 to position the appropriate storage unit 320 to an ergonomic put position for the operator 340. The controller 108 can communicate a signal to illuminate the indicator light 330 adjacent to the storage unit 320 to indicate to the operator which storage unit 320 to put the picked goods or item in. When the order-picking operation is complete, the operator 340 can transport the material sorting system 310 to an area within the warehouse via the material handling vehicle 100. In some embodiments, the material sorting system 310 can drive autonomously between areas within a warehouse. In some embodiments, the carousel assembly 318 can include an onboard controller (not shown). The onboard controller can receive the pick commands from the warehouse management system and the onboard controller can trigger the actuation mechanism 327 on the material sorting system 310 to position the appropriate storage unit 320 to an ergonomic put position for the operator 340.

In some embodiments, the carousel assembly 318 can include an electrical switch in electrical communication with the actuation mechanism 327. The electrical switch can be actuated by an operator of the material handling vehicle to trigger the actuation mechanism 327 on the material sorting system 310 to position the appropriate storage unit 320 to a desired put position for the operator. In other embodiments, the carousel assembly 318 can include hand crank or flywheel assembly mechanically coupled to the actuation mechanism 327. The hand crank can be actuated by an operator of the material handling vehicle to manually actuate the actuation mechanism 327 on the material sorting system 310 to position the appropriate storage unit 320 to a desired put position for the operator.

Figure 15:
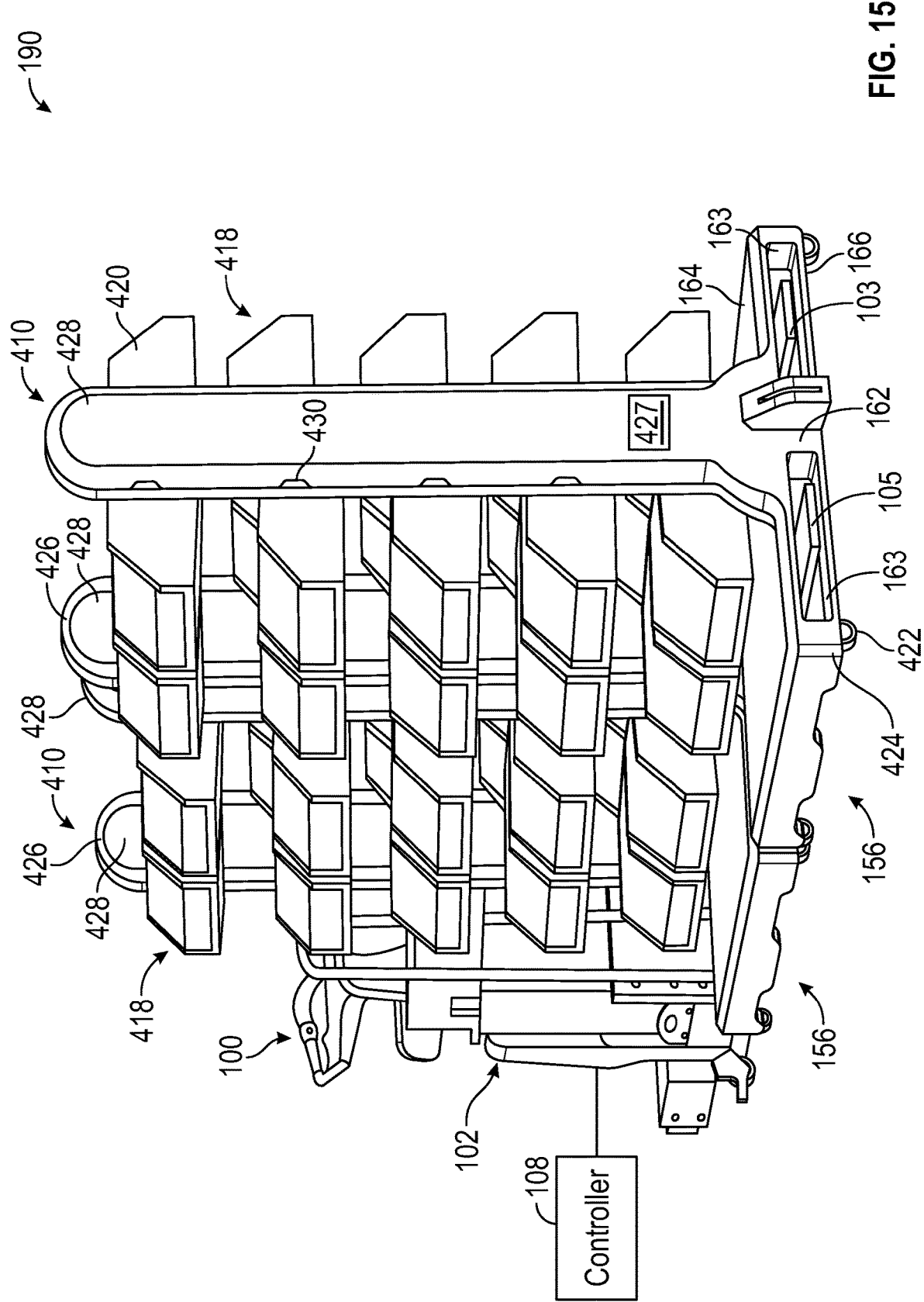
FIG. 15 is a perspective view of a set of material sorting systems according to another aspect of the present disclosure, with the set of material sorting systems operatively connected to a material handling vehicle.

FIG. 15 illustrates another embodiment of a material sorting system 410. In many aspects, the material sorting system 410 is similar to the material sorting system 310 described above and similar numbering in the 400 series is used for the material sorting system 410. For example, the material sorting system 410 includes a carousel assembly 418. The base 156 can include caster wheels 422 at corners 424 and the carousel assembly can include stalks 428 with indicators 430 and tracks 426 along which storage units 420 can move. The material sorting system 410 may also be configured to be electrically coupled to a material handling vehicle 100 illustrated here in FIG. 15 as a low-lift forklift with forks 103, 105 extending through openings or fork pockets 163 in the base 156. The electrical coupling can provide electrical power and communication between the material handling vehicle 100 and the material sorting system 410. In some aspects, however, the material sorting systems 310, 410 differ from each other. For example, the carousel assembly 418 can be rotated 90 degrees on the base 156 with respect to the orientation of the carousel assembly 318 on the base 156 of the material sorting system 310. This arrangement can provide access to the storage units from the sides of the material handling vehicle 100. This arrangement can also allow for the combination of more than one material sorting system per material handling vehicle. For example, they can be modularly stacked side by side on the forks of the material handling vehicle. In embodiments that incorporate multiple material sorting systems, multiple clamp assemblies can be integrated between the forks to accommodate the multiple material sorting systems. In some embodiments, the adjacent material sorting systems can be electrically coupled together (e.g., via cables, and the like).

Figure 16:
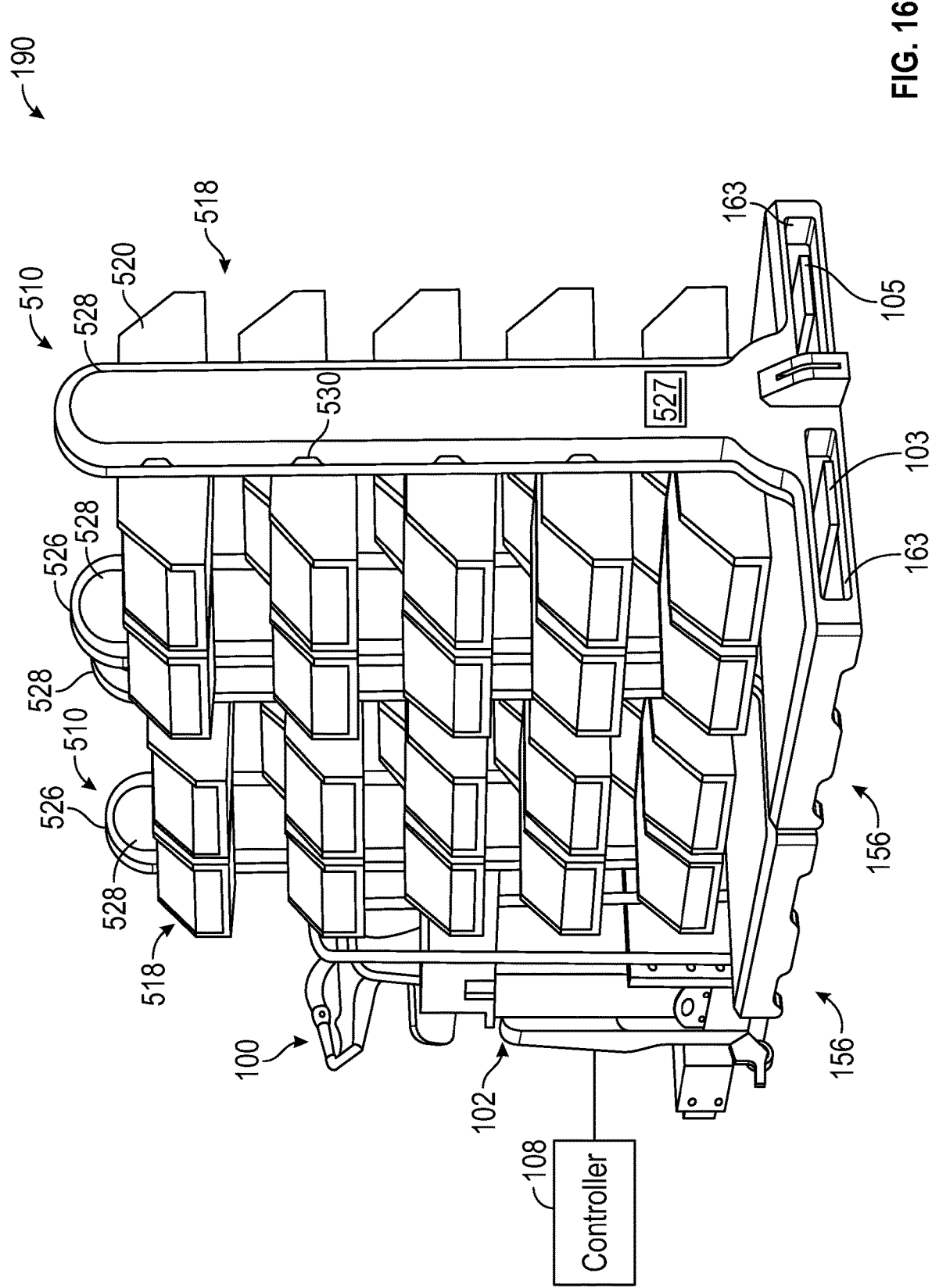
FIG. 16 is a perspective view of another set of material sorting systems according to another aspect of the present disclosure.

In other embodiments, other configurations are possible. For example, looking at FIG. 16, another embodiment of a material sorting system 510 is shown. In many aspects the, the material sorting system 510 is similar to the material sorting systems 410 described above and similar numbering in the 500 series is used for the material sorting system 510. For example, the material sorting system 510 includes a carousel assembly 518 with stalks 528 with indicators 530 and tracks 526 along which storage units 520 can move. Similarly, the material sorting system 510 can be configured to be electrically coupled to a material handling vehicle 100, shown as the low-lift forklift illustrated in FIG. 16. In some aspects, however, the material sorting systems 410, 510 can differ. For example, the base 156 can be a stationary base without powered or driven wheels incorporated therein. The base 156 can have removable caster wheels or can be provided without caster wheels. In these embodiments, the material sorting system 510 can, for example, be located at the end of an aisle and positioned for a vehicle (e.g., the material handling vehicle 100) to engage therewith and move the material sorting system 510 as required. Additionally or alternatively, the material sorting system 510 can be placed on top of an Automated Guided Vehicle (AGV) that can move the material sorting system 510 from location to location. As previously described herein, the material sorting system 510 can be powered by the onboard power supply 102 via the clamp assembly (not shown) on the material handling vehicle.

Figure 17:
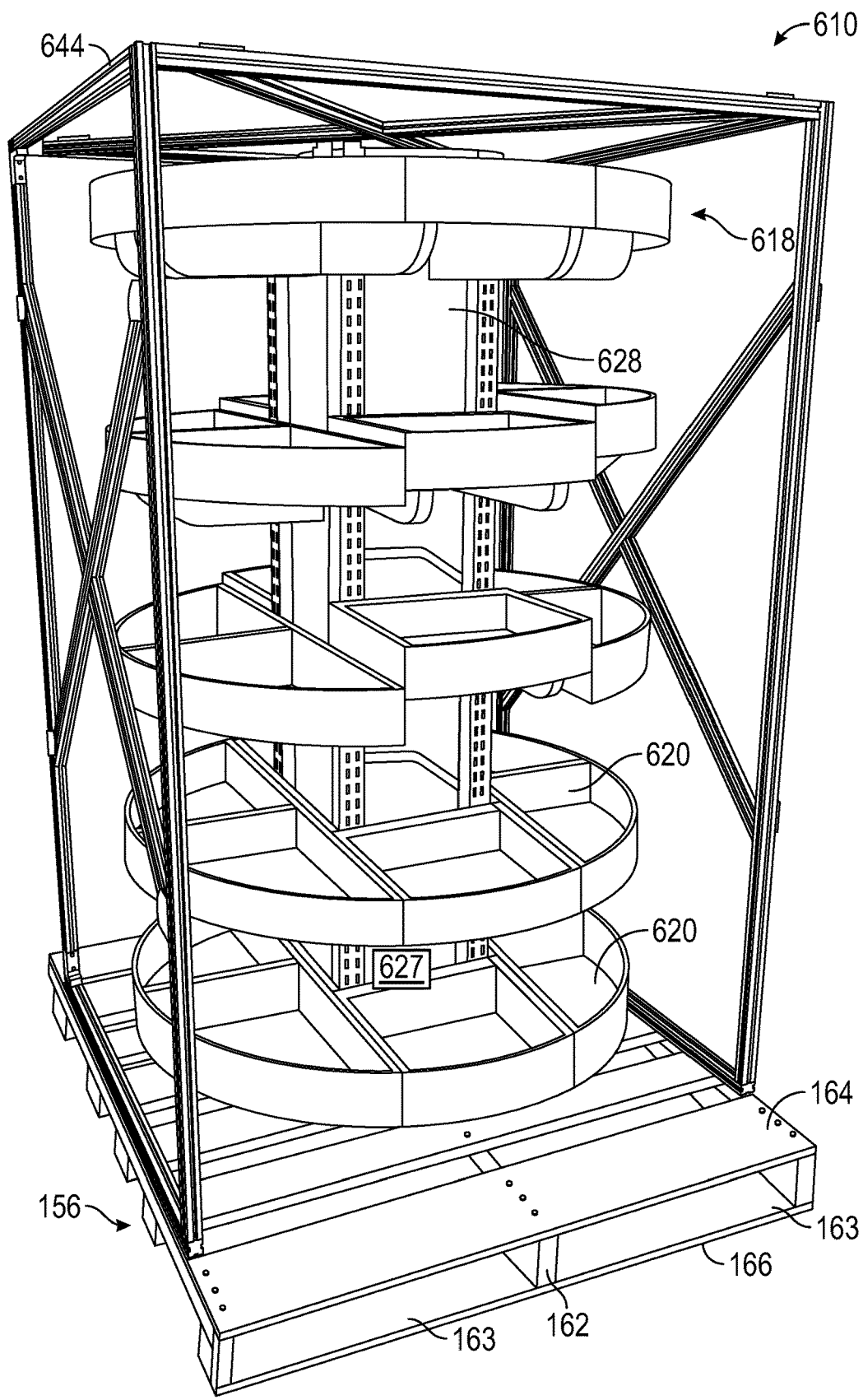
FIG. 17 is a perspective view of yet another material sorting system according to another aspect of the present disclosure.

In other embodiments, other configurations are possible. For example, looking at FIG. 17, another embodiment of a material sorting system 610 is shown. In many aspects the, the material sorting system 610 is similar to the material sorting systems 510 described above and similar numbering in the 600 series is used for the material sorting system 610. For example, the material sorting system 610 includes a carousel assembly 618 with a plurality of storage units 620. Similarly, the material sorting system 610 can be configured to be electrically coupled to a material handling vehicle 100. In some aspects, however, the material sorting systems 510, 610 can differ. For example, the material sorting system 610 can be a horizontal or rotary carousel and include a single central stalk 628 extending vertically from the base 156. The carousel assembly 618 can be configured to rotate about the base 156 around an axis generally defined by the stalk 628. In the illustrated embodiment, the material sorting system 610 can include an external cage or structure 644 at least partially surrounding the carousel assembly 618. As previously described herein, the material sorting system 610 can be powered by the onboard power supply via the clamp assembly (not shown) on the material handling vehicle.

Figure 18:
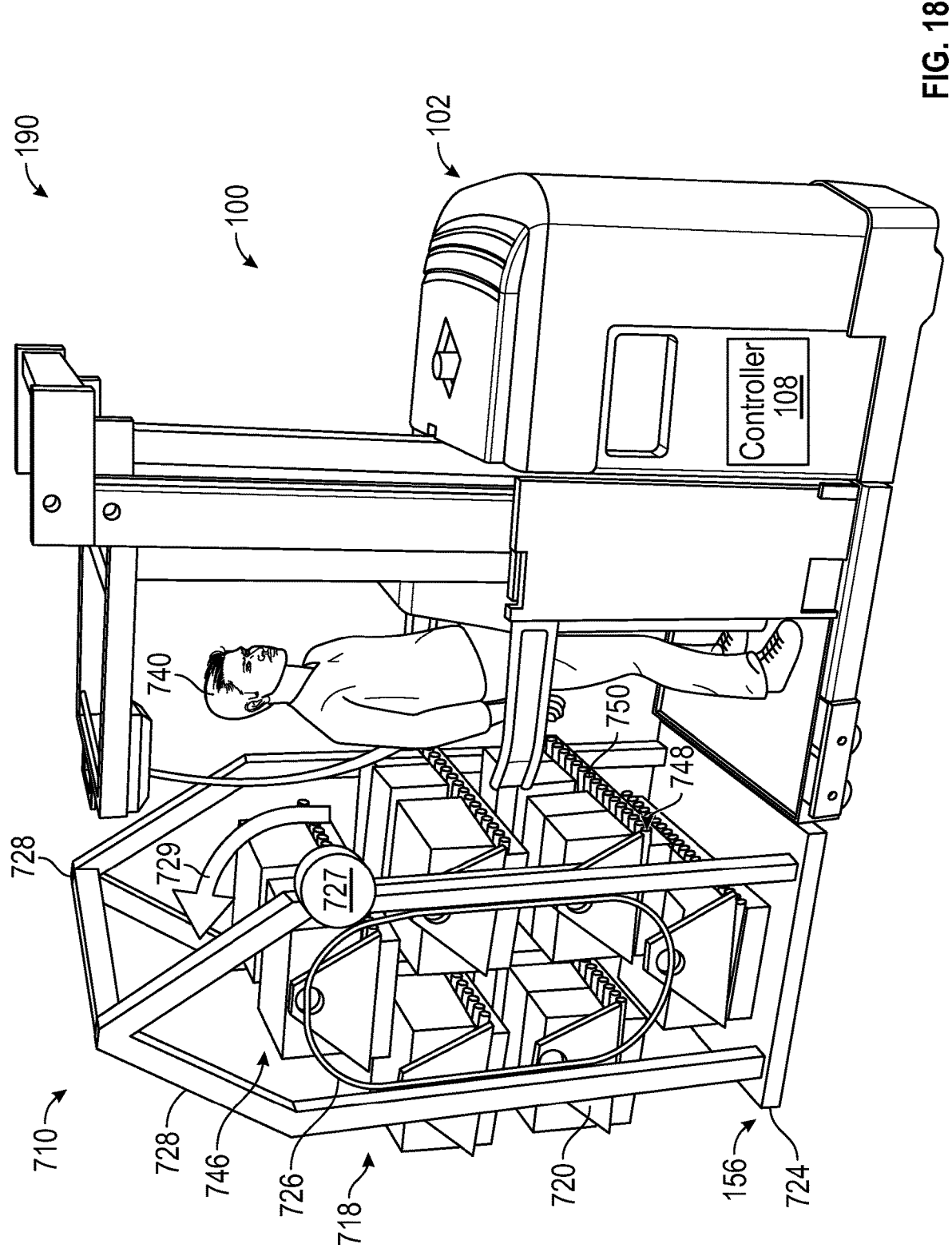
FIG. 18 is a perspective view of yet another material sorting system according to another aspect of the present disclosure.

In other embodiments, yet further various configurations are possible. For example, looking at FIG. 18, another embodiment of a material sorting system 710 is shown. In many aspects the, the material sorting system 710 is similar to the material sorting systems 310 and 410 described above and similar numbering in the 700 series is used for the material sorting system 710. For example, the material sorting system 710 includes a carousel assembly 718. The base 156 can assembly can include stalks 728 extending from the base 156 and tracks 726 along which storage units 720 can move. An actuation mechanism 727 can be configured to move the storage units 720 along the tracks 726. The material sorting system 710 may also be configured to be electrically coupled to a material handling vehicle 100 via a clamp assembly 110 (see FIG. 11). The electrical coupling can provide electrical power and communication between the material handling vehicle 100 and the material sorting system 710. In some aspects, however, the material sorting systems 310, 710 differ from each other. For example, lateral side of the stalks 728 on the carousel assembly 718 can include openings 746 to allow the storage units 720 to be loaded/unloaded from the lateral sides of the carousel assembly 718. In the illustrated embodiment, the storage units 720 can include a conveyor track 748 with a plurality of rollers 750 along a base of each of the storage units 720. In some embodiments, the rollers 750 may be powered and activated (e.g., instructed to roll in a first direction or a second direction) by the connection provided between the base 156 and the clamp assembly 110.

Figure 19:
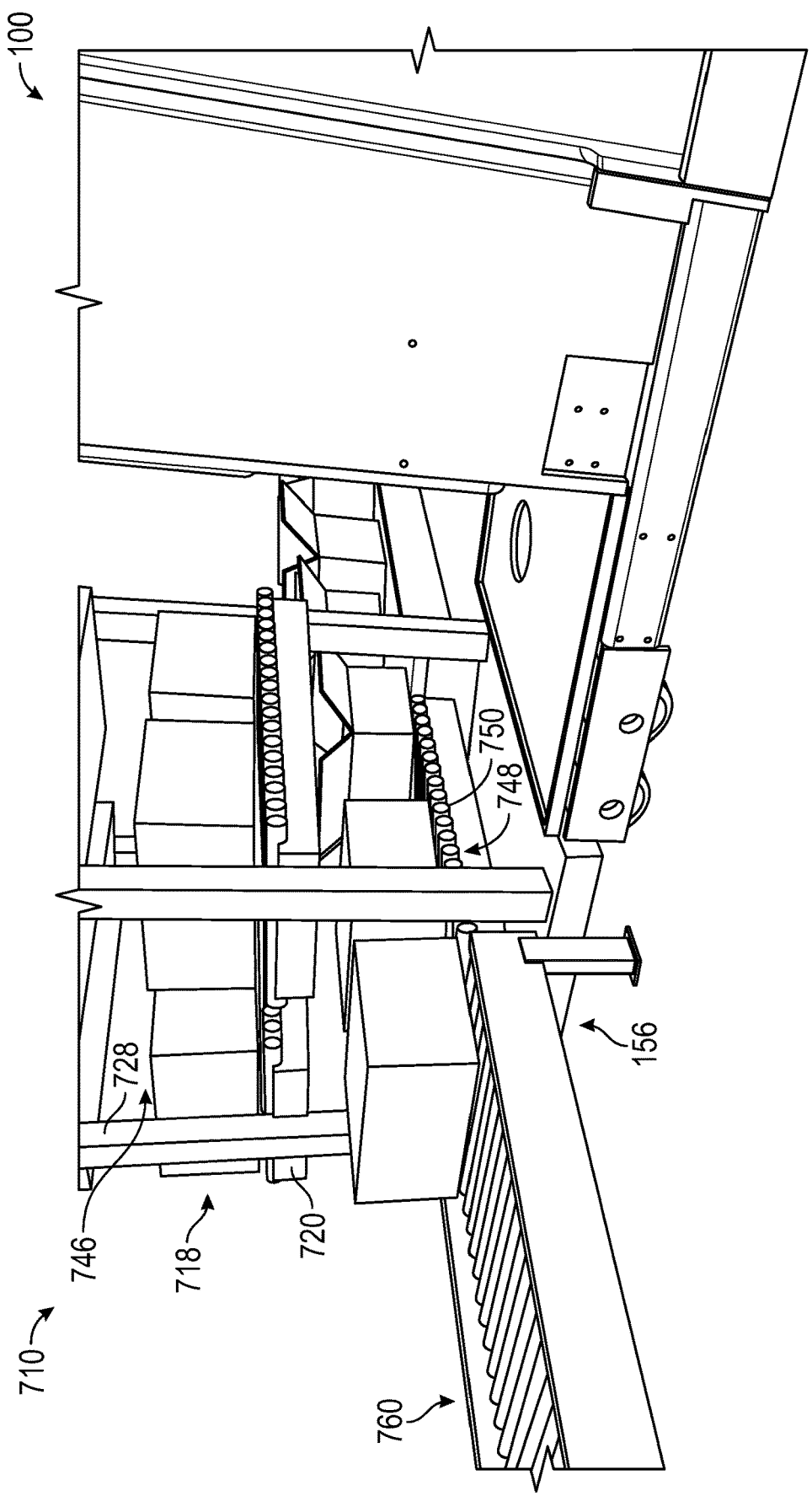
FIG. 19 is a partial perspective view of the material sorting system of FIG. 18 aligned with a conveyor system.

Referring now to FIG. 19, the openings 746 in the stalks 728, along with the conveyor track 748 in the storage unit 720, can allow loading and unloading operations to be conducted from external conveyor systems 760 within a warehouse environment. That is, the material handling vehicle 100 may be driven up to a conveyor system 760 and lateral sides of the material sorting system 710 can be aligned with the conveyor system 760 such that a storage unit 720 on the carousel assembly 718 is adjacent to an end of the conveyor system 760. Goods can then be loaded onto the storage unit 720, or unloaded from the storage unit 720. In some embodiments, the conveyor track 748 and/or rollers 750 can be rotated via a conveyor actuation mechanism (not shown). In some embodiments, the conveyor actuation mechanism can be in electrical communication with the electrical contacts within the base 156 to receive power and communication signals.

Furthermore, certain features and combinations of features that are presented with respect to particular embodiments in the discussion above, can be utilized in other embodiments and in other combinations, as appropriate. In this regard, for example, different configurations of the base (e.g., the electrical contacts) or the carousel assembly (e.g., the orientation of the stalks) and so on as presented with respect to a particular one of the material sorting systems 310, 410, 510, 610, 710 can be implemented in combination with features of any number of the other material sorting systems 310, 410, 510, 610, 710 or others.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

What is claimed is:

1. A material sorting system adapted to engage a material handling vehicle, the material sorting system comprising:
 a base including fork pockets adapted to receive a pair of forks from the material handling vehicle;
 a carousel assembly coupled to the base, the carousel assembly including:
  a plurality of storage units; and
  an actuation mechanism configured to move the plurality of storage units relative to the base; and
 at least one electrical contact within the base and in electrical communication with the carousel assembly, the at least one electrical contact being adapted to engage with a corresponding electrical contact on a clamp assembly of the material handling vehicle to transfer power or a communication signal between the material handling vehicle and the carousel assembly.

2. The material sorting system of claim 1, wherein the at least one electrical contact protrudes from a surface of the base into a cavity formed by the fork pockets.

3. The material sorting system of claim 1, wherein the at least one electrical contact is spring-loaded.

4. The material sorting system of claim 1, wherein the carousel assembly further comprises:
 a set of stalks extending from the base, and
 a movable track on each stalk along which the plurality of storage units are coupled.

5. The material sorting system of claim 4, wherein the actuation mechanism is configured to move the plurality of storage units between stop locations along the movable track.

6. The material sorting system of claim 5, wherein the set of stalks include indicator lights adjacent to the stop locations for the plurality of storage units and configured to indicate a placement position for picked goods.

7. A material sorting system, comprising:
 a base including:
  a pair of fork pockets adapted to receive a pair of forks from a material handling vehicle;
  a top wall;
  a bottom wall spaced apart from the top wall; and
  a center wall arranged between the top wall and the bottom wall and dividing the pair of fork pockets;
 a carousel assembly coupled to the base and including a plurality of storage units; and
 at least one electrical contact within the base and in electrical communication with the carousel assembly, the at least one electrical contact being adapted to transfer power or a communication signal between the material handling vehicle and the carousel assembly.

8. The material sorting system of claim 7, wherein the at least one electrical contact is spring-loaded.

9. The material sorting system of claim 7, wherein the at least one electrical contact protrudes into a cavity formed by the pair of fork pockets.

10. The material sorting system of claim 9, wherein the at least one electrical contact protrudes from the bottom wall or the top wall of the base.

11. The material sorting system of claim 9, wherein the at least one electrical contact protrudes from the center wall of the base.

12. The material sorting system of claim 7, wherein the electrical contact is a first power contact extending from the top wall of the base towards the bottom wall.

13. The material sorting system of claim 12, wherein the base further includes a second power contact extending from the bottom wall and opposite the first power contact.

14. The material sorting system of claim 13, wherein the base further includes:
a first signal contact extending from the top wall of the base towards the bottom wall; and
a second signal contact extending from the bottom wall and opposite the first signal contact.

15. The material sorting system of claim 14, wherein the first power contact and the first signal contact are arranged within one fork pocket of the pair of fork pockets; and
wherein the second power contact and the second signal contact are arranged within the other fork pocket of the pair of fork pockets.

16. The material sorting system of claim 7, wherein the carousel assembly further includes an actuation mechanism configured to move the plurality of storage units relative to the base.

17. The material sorting system of claim 16, wherein the actuation mechanism is configured to move the plurality of storage units in an upward and downward direction relative to the base.

18. The material sorting system of claim 16, wherein the actuation mechanism is configured to rotate the plurality of storage units relative to the base.

19. The material sorting system of claim 7, wherein the plurality of storage units includes a plurality of powered rollers along a base of each of the plurality of storage units.

20. The material sorting system of claim 19, wherein the carousel assembly includes a conveyor actuation mechanism configured to rotate the plurality of powered rollers to load or unload items onto a storage unit among the plurality of storage units.

21. A material sorting system, comprising:
a carousel assembly including:
a plurality of storage units; and
an actuation mechanism configured to move the plurality of storage units relative to a base; and
an electrical contact in electrical communication with the actuation mechanism, the electrical contact being adapted to engage with a corresponding electrical contact on a material handling vehicle to transfer power or a communication signal between the material handling vehicle and the carousel assembly;
wherein the base defines a first fork pocket and a second fork pocket adapted to receive a pair of forks from the material handling vehicle; and
wherein the electrical contact is arranged within at least one of the first and second fork pockets.

22. The material sorting system of claim 21, further comprising a drive system coupled to the base.

23. The material sorting system of claim 21, wherein the carousel assembly further comprises:
a set of stalks extending from the base; and
a movable track on each stalk along which the plurality of storage units are coupled, wherein the actuation mechanism is configured to move the plurality of storage units between stop locations along the movable track.

24. The material sorting system of claim 23, wherein the set of stalks include indicator lights adjacent to the stop locations for the plurality of storage units and configured to indicate a placement position for picked goods.

* * * * *